(12) United States Patent
Nortey

(10) Patent No.: US 6,402,360 B1
(45) Date of Patent: Jun. 11, 2002

(54) INTERNAL BATCH MIXING MACHINES AND ROTORS

(75) Inventor: Narku O. Nortey, Erie, PA (US)

(73) Assignee: Skinner Engine Company, Erie, PA (US)

( * ) Notice: Subject to any disclaimer, the term of this patent is extended or adjusted under 35 U.S.C. 154(b) by 0 days.

(21) Appl. No.: 09/276,411

(22) Filed: Mar. 25, 1999

Related U.S. Application Data

(60) Provisional application No. 60/079,790, filed on Mar. 28, 1998, and provisional application No. 60/099,955, filed on Sep. 11, 1998.

(51) Int. Cl.$^7$ .............................. B01F 7/08; B01F 7/24
(52) U.S. Cl. .............................. 366/85; 366/84; 366/88
(58) Field of Search .............................. 366/83, 84, 85, 366/88, 300, 301; 425/204, 208, 209

(56) References Cited

U.S. PATENT DOCUMENTS

| | | | |
|---|---|---|---|
| 1,200,070 A | | 10/1916 | Banbury |
| 1,260,684 A | * | 3/1918 | Kempter |
| 1,279,824 A | | 9/1918 | Banbury |
| 4,084,263 A | | 4/1978 | Millauer ...................... 366/84 |
| 4,234,259 A | | 11/1980 | Wiedmann et al. ........... 366/81 |
| 4,284,358 A | | 8/1981 | Sato et al. .................... 366/97 |

(List continued on next page.)

OTHER PUBLICATIONS

James L. White, Development of Internal Mixer Technology for the Rubber Industry Rubber Chemistry and Technology, vol. 65, Issue #3, pp. 527–576, Jul.–Aug. 1992 Institute of Polymer Engineering, The University of Akron, Akron, Ohio 44325–0301 Publisher: Rubber Division of American Chemical Society.

*Primary Examiner*—Charles E. Cooley
*Assistant Examiner*—David Sorkin
(74) *Attorney, Agent, or Firm*—McGuireWoods LLP; Paul E. McGowan, Esq.

(57) ABSTRACT

An internal batch mixing machine includes a mixing chamber having a pair of cavities in which a first and a second rotor are mounted adjacent one another and are driven in opposite directions to mix material. The circumference of each rotor is divided into first, second, third and fourth sequential quadrants spaced in a direction opposite to the intended direction of rotation of that rotor. Each of the rotors has preferably a pair of lobes or wings located in every other quadrant of that rotor, although three lobe rotors are possible. Each lobe has a leading end and a trailing end. The first rotor has a pair of lobes located in its first and third quadrants, while the second rotor has a pair of lobes located in its second and fourth quadrants. One of the lobes of each pair of lobes is longer than the other, and each lobe extends downstream at an acute cohelix angle toward the other lobe of its pair. The long lobe of each pair of lobes has its leading end at or near the axial end of its rotor, and a short lobe of each pair of lobes has its leading end at the other axial end of the rotor. Long lobes in the second and fourth quadrant of the second rotor have their leading ends, respectively, at or near the axial ends of the second rotor which are opposite from the axial ends at which long lobes in the first and third quadrant have their leading ends. The lobes of each pair of lobes have respective lengths, locations of origin within the rotor quadrant in which they are located and acute cohelix angles at which they extend so as to cause material adjacent the longer of the lobes of each pair of lobes to be pushed away from the axial end of the rotor at or near which its leading end is located and toward the other end of that rotor, and to form a space between the trailing ends of each pair of lobes having a size which causes confluent material at the space to be squeezed between the trailing ends of both lobes of each pair of lobes and to flow out of that space, thereby releasing the squeezed material and adding turbulence to further mix the material.

24 Claims, 20 Drawing Sheets

U.S. PATENT DOCUMENTS

| | | | |
|---|---|---|---|
| 4,456,381 A | 6/1984 | Inoue et al. | 366/97 |
| 4,714,350 A | 12/1987 | Nortey | 366/84 |
| 4,744,668 A | 5/1988 | Nortey | 366/76 |
| 4,834,543 A | 5/1989 | Nortey | 366/97 |
| 4,859,074 A * | 8/1989 | Asai et al. | |
| 4,893,936 A | 1/1990 | Borzenski et al. | 366/76 |
| 5,044,760 A | 9/1991 | Asai | 366/97 |
| 5,297,935 A | 3/1994 | Passoni | 416/183 |
| 5,520,455 A | 5/1996 | Yamada et al. | 366/97 |
| 5,672,006 A | 9/1997 | Hanada et al. | 366/84 |
| 5,984,516 A * | 11/1999 | Inoue et al. | |

* cited by examiner

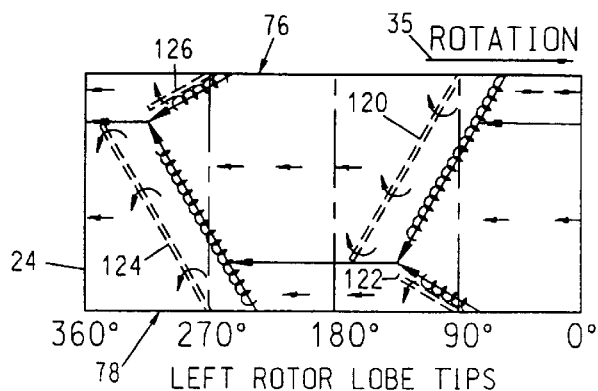

FIG. 4A

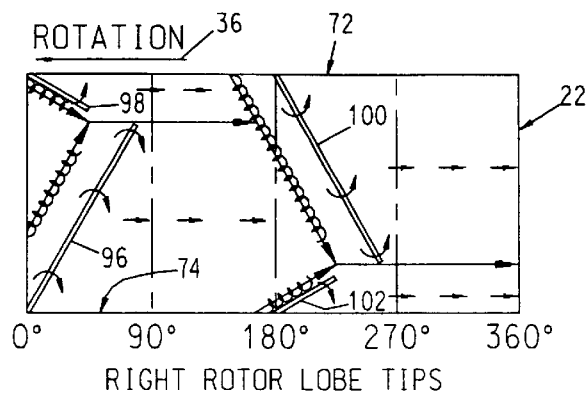

FIG. 4B

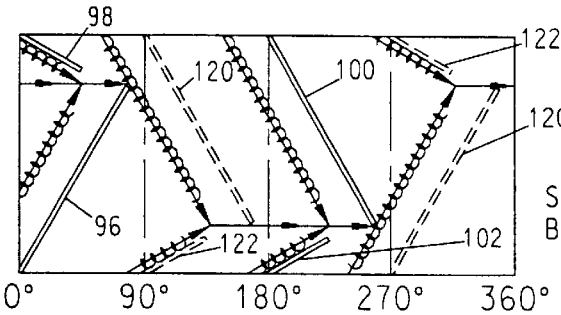

FIG. 4C

SOLID LINE = RIGHT LOBE TIPS
BROKEN LINE = LEFT LOBE TIPS

INTERACTION OF RIGHT & LEFT ROTOR LOBE TIPS
WITHIN THE WINDOW OF INTERACTION

 = HIGH INTENSIVE (HIGH SHEAR) MIXING OF MATERIAL PASSING OVER TIPS OF ROTOR LOBES.

– – = MATERIAL WHICH HAS GONE THROUGH THE HIGH SHEAR ZONE OF THE LOBE.

 = DISTRIBUTIVE MIXING (BLENDING) PRODUCED BY ROLLING BANKS OF MATERIAL IN AXIAL DIRECTIONS WITH AXIAL MOVEMENT AND AXIAL FLOW AT THE LEADING SURFACE OF A LOBE.

 = SQUEEZE-FLOW OF MATERIAL WITH RELIEF.

 = MATERIAL WHICH HAS GONE THROUGH RELIEF.

SOLID LINE = RIGHT LOBE TIPS
BROKEN LINE = LEFT LOBE TIPS

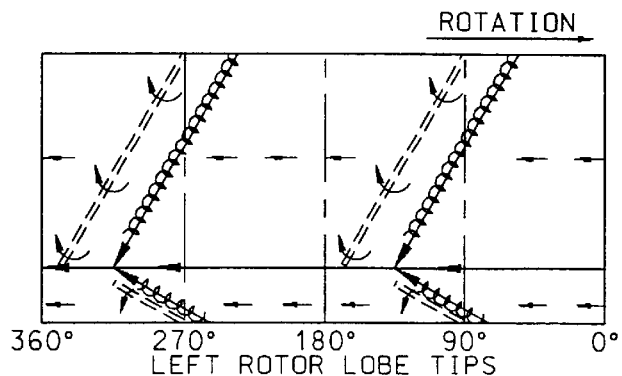

FIG. 7A

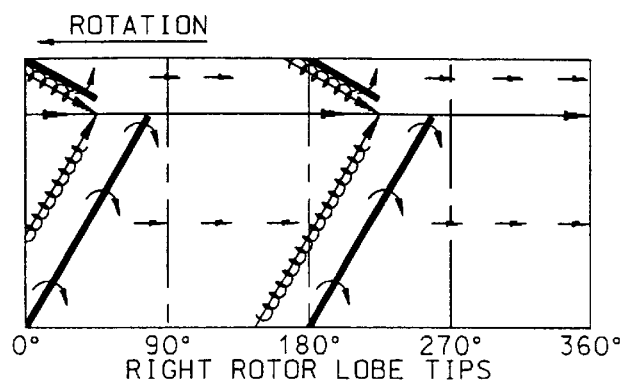

FIG. 7B

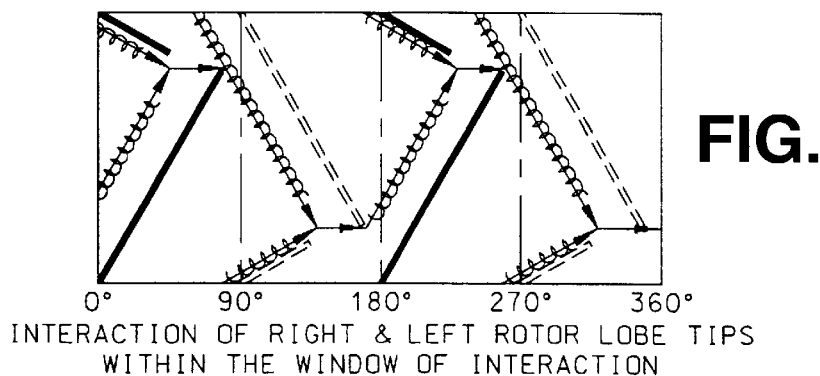

FIG. 7C

INTERACTION OF RIGHT & LEFT ROTOR LOBE TIPS
WITHIN THE WINDOW OF INTERACTION
SOLID LINE = RIGHT LOBE TIPS
BROKEN LINE = LEFT LOBE TIPS

◯ OR ◯ = HIGH INTENSIVE (HIGH SHEAR) MIXING OF MATERIAL PASSING OVER TIPS OF ROTOR LOBES.

— · — = MATERIAL WHICH HAS GONE THROUGH THE HIGH SHEAR ZONE OF THE LOBE.

⦿⦿⦿⦿⟶ = DISTRIBUTIVE MIXING (BLENDING) PRODUCED BY ROLLING BANKS OF MATERIAL IN AXIAL DIRECTIONS WITH AXIAL MOVEMENT AND AXIAL FLOW AT THE LEADING SURFACE OF A LOBE.

⤳ = SQUEEZE-FLOW OF MATERIAL WITH RELIEF.

⟶ = MATERIAL WHICH HAS GONE THROUGH RELIEF.

SOLID LINE = RIGHT LOBE TIPS
BROKEN LINE = LEFT LOBE TIPS

SOLID LINE = RIGHT LOBE TIPS
BROKEN LINE = LEFT LOBE TIPS

SOLID LINE = RIGHT WING TIPS
BROKEN LINE = LEFT WING TIPS

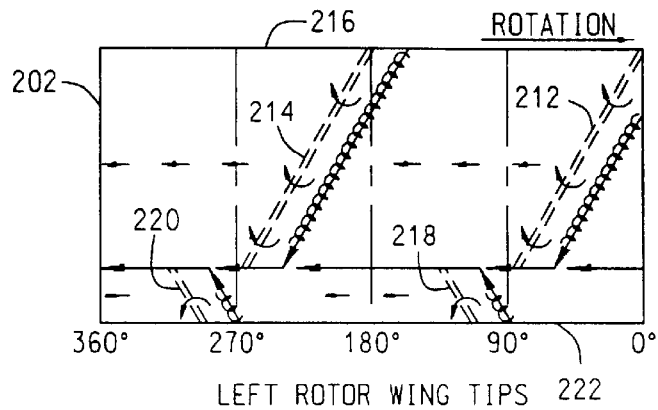
PRIOR ART
FIG. 13A
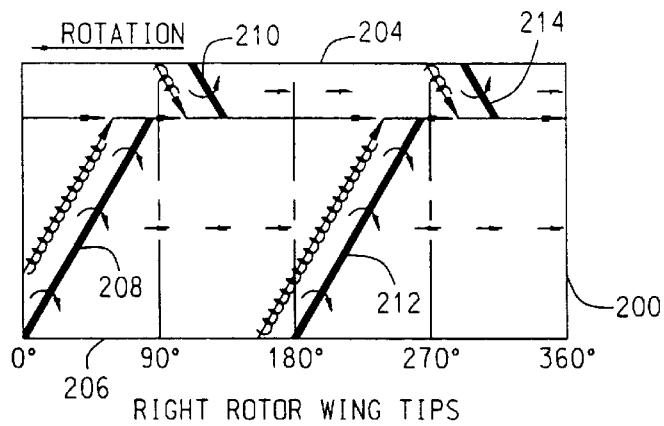
PRIOR ART
FIG. 13B
 = HIGH INTENSIVE (HIGH SHEAR) MIXING OF MATERIAL PASSING OVER TIPS OF ROTOR LOBES.
– – = MATERIAL WHICH HAS GONE THROUGH THE HIGH SHEAR ZONE OF THE LOBE.
⦅⦆► = DISTRIBUTIVE MIXING (BLENDING) PRODUCED BY ROLLING BANKS OF MATERIAL IN AXIAL DIRECTIONS WITH AXIAL MOVEMENT AND AXIAL FLOW AT THE LEADING SURFACE OF A LOBE.
———► = MATERIAL WHICH HAS GONE THROUGH RELIEF.

SOLID LINE = RIGHT WING TIPS
BROKEN LINE = LEFT WING TIPS

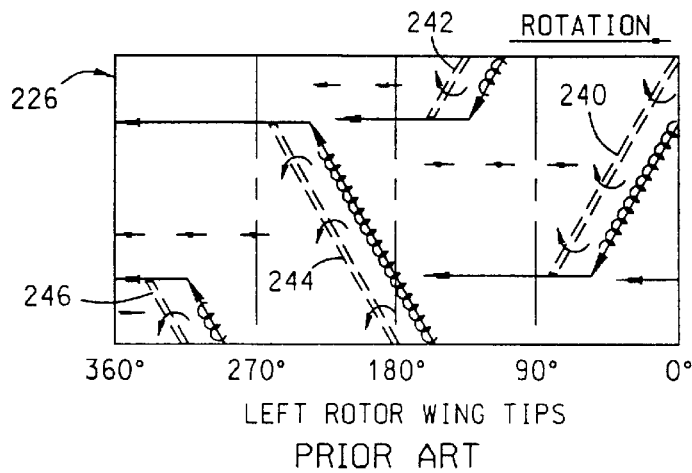

LEFT ROTOR WING TIPS
PRIOR ART
FIG. 15A

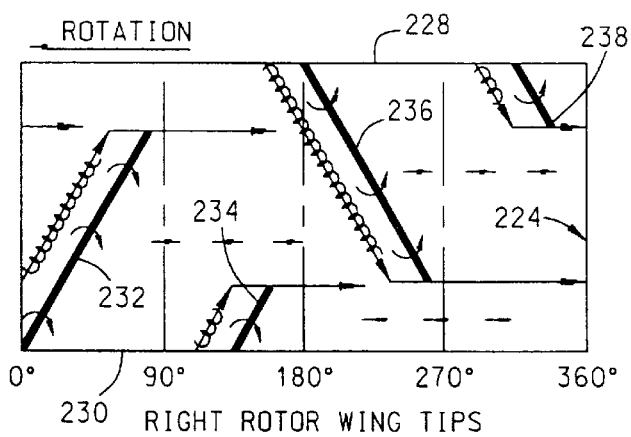

RIGHT ROTOR WING TIPS
PRIOR ART
FIG. 15B

 = HIGH INTENSIVE (HIGH SHEAR) MIXING OF MATERIAL PASSING OVER TIPS OF ROTOR LOBES.

— — = MATERIAL WHICH HAS GONE THROUGH THE HIGH SHEAR ZONE OF THE LOBE.

⦉⦊⦉⦊► = DISTRIBUTIVE MIXING (BLENDING) PRODUCED BY ROLLING BANKS OF MATERIAL IN AXIAL DIRECTIONS WITH AXIAL MOVEMENT AND AXIAL FLOW AT THE LEADING SURFACE OF A LOBE.

———► = MATERIAL WHICH HAS GONE THROUGH RELIEF.

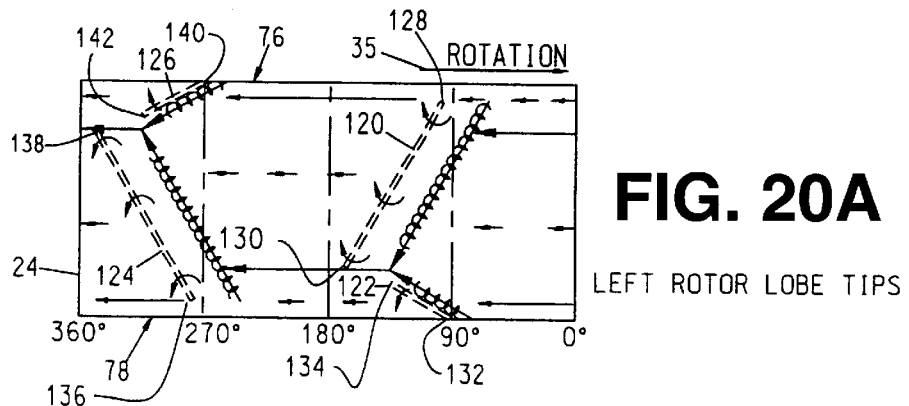

FIG. 20A

LEFT ROTOR LOBE TIPS

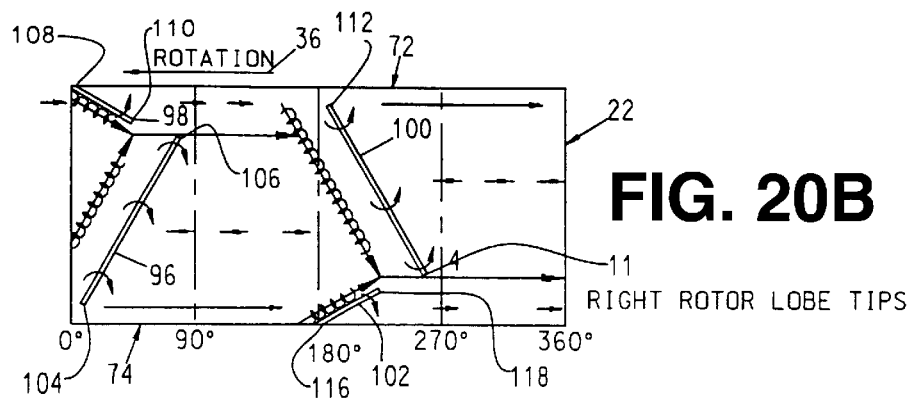

FIG. 20B

RIGHT ROTOR LOBE TIPS

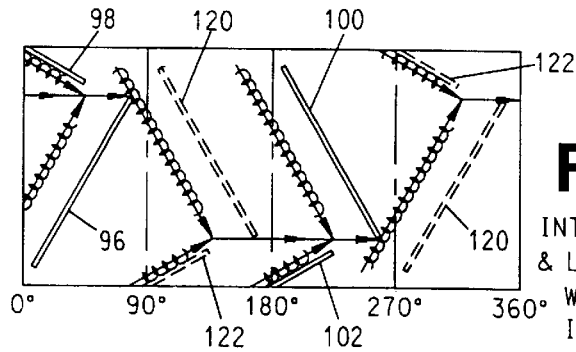

FIG. 20C

INTERACTION OF RIGHT & LEFT ROTOR LOBE TIPS WITHIN THE WINDOW OF INTERACTION

SOLID LINE = RIGHT LOBE TIPS
BROKEN LINE = LEFT LOBE TIPS

- ⊙R = HIGH INTENSIVE (HIGH SHEAR) MIXING OF MATERIAL PASSING OVER TIPS OF ROTOR LOBES.
- — — = MATERIAL WHICH HAS GONE THROUGH THE HIGH SHEAR ZONE OF THE LOBE.
- ⌇⌇⌇ = DISTRIBUTIVE MIXING (BLENDING) PRODUCED BY ROLLING BANKS OF MATERIAL IN AXIAL DIRECTIONS WITH AXIAL MOVEMENT AND AXIAL FLOW AT THE LEADING SURFACE OF A LOBE.
- ⤳ = SQUEEZE-FLOW OF MATERIAL WITH RELIEF.
- ——— = MATERIAL WHICH HAS GONE THROUGH RELIEF.

INTERNAL BATCH MIXING MACHINES AND ROTORS

This application claims the benefit of Provisional Applications No. 60/079,790 filed on Mar. 28, 1998 and No. 60/099,955 filed on Sep. 11, 1998.

BACKGROUND OF THE INVENTION

This invention relates to internal batch mixing machines having a mixing chamber and a driving mechanism which causes a pair of rotors to rotate in opposite directions to mix materials and relates to the structure of rotors for use in these machines.

In internal batch mixing machines, a batch of materials to be mixed into a homogeneous mass is fed into a mixing chamber through a vertical chute and is pushed down into the mixing chamber under pressure by a ram located in the chute. This ram may be driven hydraulically or pneumatically or by any other convenient type of mechanism. When the ram is moved down to its operating position during the mixing of a batch of ingredients, the lower face of the ram forms an upper closure of the mixing chamber. The mixture of ingredients which is produced can be removed from the mixing chamber by opening a door to a discharge opening at the bottom of the chamber. The door is then closed prior to introducing the next batch of materials into the mixing chamber.

Internal batch mixing machines mix materials through the use of a pair of rotors which are rotated in opposite directions from one another as a batch of materials are mixed. The rotors are rotated by a drive system which includes a motor, a gear mechanism for connecting the motor to the rotors and controls for stopping, starting, and controlling the speed of the motor. Each of the rotors has a drive end connected to the drive system and coolant or water end through which coolant such as water is circulated through the rotors. Each of these rotors has a plurality of lobes, that is, extensions or protusions of the rotor beyond its smallest or minor diameter, which mix the materials. The lobes may be wings, that is elongated extensions having generally narrow top surfaces along their lengths.

This invention relates to internal batch mixing machines that include rotors of either an intermeshing or a non-intermeshing type. Intermeshing rotors are constructed and installed within these machines so that the lobes of one rotor fit into spaces between or within the lobes of the other rotor. Non-intermeshing rotors are constructed and installed so that the ends or the major diameter of the lobes of one rotor do not rotate into the space within which the lobes of the other rotor rotate. In an internal batch mixing machine, intermeshing rotors must always be driven at the same rotational speed in synchronized relationship with one another. Non-intermeshing rotors may each be driven at the same rotational speed or they may be driven at different rotational speeds, sometimes called the friction ratio operating mode, for achieving different effects with respect to a batch of ingredients.

Internal batch mixing machines are well known for mixing polymer materials such as rubber. One of the earliest of these machines is shown in U.S. Pat. No. 1,200,070, issued in 1916. While there have been many different internal batch mixing machines based on different rotor designs, there is a continuing need to provide internal batch mixing machines, including rotors used in these machines, to more intensively mix the materials put into them, more rapidly reach a homogeneous mass and thus increase the productivity of these machines.

SUMMARY OF THE INVENTION

The internal batch mixing machine of this invention includes a housing having a mixing chamber located within it which is shaped to have a first rotor and a second rotor mounted on parallel, horizontal axes. The housing includes an inlet for receiving materials to be mixed within the mixing chamber and an outlet for discharging mixed materials from the mixing chamber. The mixing machine also includes a drive system which can rotate the two rotors in opposite directions within the mixing chamber.

Each of the two rotors has an axis of rotation, a first axial end and a second axial end. One of these ends is connected to the drive system and is called the drive end and the other end receives coolant for the rotors and is sometimes called the coolant end. When the rotors are installed in the mixing machine, the first axial ends of both of the rotors are adjacent one another, and the second axial ends of both of the rotors are adjacent one another. The circumference of each rotor is divided into first, second, third and fourth sequential quadrants which are spaced in a direction opposite to the intended direction of rotation of that rotor. In the preferred embodiment of this invention each of these four quadrants will occupy 90° of the circumference of the rotor. However, the quadrants may be of any size desirable for a particular application of this invention.

In accordance with one aspect of this invention, each of the rotors can have a separate pair of lobes located in every other quadrant of the rotor. Each lobe has a leading end and a trailing end. In this configuration of this invention, the first rotor has a pair of lobes in each of its first and third quadrants, while the second rotor has a pair of lobes in each of its second and fourth quadrants. One of the lobes of each pair of lobes is longer than the other. In other configurations of this invention, the first rotor has a pair of lobes in one of the first and third quadrants and at least a longer lobe in the other, and the second rotor has a pair of lobes in one of the second and fourth quadrants and at least a longer lobe in the other. In the preferred embodiment of this invention each of the pairs of lobes has one lobe with its leading end at one axial end of the rotor on which it is located and the other lobe with its leading end at the other axial end of that rotor. It is preferable to have the leading ends of the longer lobes in the first quadrant and in the third quadrant of the first rotor located at opposite axial ends of the first rotor. It does not matter which of the longer lobes originates on the drive end of the first rotor and which of the longer lobes originates on the coolant end. However, in accordance with the preferred embodiment of this invention significant benefits in mixing will be attained even if both of the longer lobes originates at the same end of the first rotor.

But no matter which configuration of lobes is used on the first rotor in the preferred embodiment of this invention, the longer lobes in the second and fourth quadrants of the second rotor may have their leading ends, respectively, at the axial ends of the second rotor which are opposite from the axial ends at which the longer lobes in the first and third quadrant have their leading ends. Each of the lobes on both rotors extends in a direction opposite to the intended direction of rotation of the rotor on which it is located at an acute angle with respect to a line through its leading end which is parallel to the axis of rotation of that rotor.

In further accordance with this invention, the lobes of each pair of lobes have respective lengths, locations of origin within the rotor quadrant in which they are located and acute cohelix angles at which they extend to cause material adjacent the longer of the lobes of each pair of lobes to be pushed away from the axial end of the rotor at which its leading end is located and toward the other axial end of that rotor, and to form a space between the trailing ends of each pair of lobes at which material flowing adjacent both of each pair of lobes become confluent, with the space formed between the trailing ends having a size which causes the confluent material to be squeezed between the trailing ends of both lobes of each pair of lobes and to flow out of the space between the trailing ends of both of the lobes. As a result, as each quadrant of each rotor which has a pair of lobes within it rotates, material being mixed is released through the space between the trailing ends of each pair of lobes after it has been squeezed, adding a turbulence to further mix the material as it flows from one axial end of the rotors to the other.

In accordance with another embodiment of this invention, the leading ends of the long lobes of each rotor may be located near rather than at opposite axial ends of the rotor. In this embodiment of the invention, the axial length of each short lobe should be longer than the length of the space between the leading end of each long lobe and the axial end of the rotor which that leading end is near. Each short lobe deflects material which passes between the leading end of a long lobe and the axial end of the rotor that leading end is near toward the space where material is squeezed and released.

While the preferred embodiment of this invention utilizes intermeshing rotors each housing a separate pair of lobes in every other quadrant as described above, this invention contemplates other rotor configurations, as well. For example, an internal batch mixing machine can be constructed according to the principles of this invention by eliminating a short lobe from one of the quadrants of one or both of the rotors. As a result, one or both of the rotors will have only three lobes located on it, two of which will be a pair of lobes in one quadrant of the rotor which are constructed in accordance with the principles of this invention. Furthermore, any configuration of rotors constructed in accordance with the principles of this invention can be used as non-intermeshing rotors as well as in an intermeshing arrangement.

Thus, this invention does not reside in any one of the features of the internal batch mixers and rotors which are disclosed above and in the Description of the Preferred Embodiments and claimed below. Rather, this invention is distinguished from the prior art by its particular combination of features of the internal batch mixers and rotors disclosed. Important features of this invention have been disclosed in the Detailed Description of the Preferred Embodiments of this invention which are shown and described below, to illustrate the best mode contemplated to date of carrying out this invention.

Those skilled in the art will realize that this invention is capable of embodiments which are different from those shown, and the details of the structure of the internal batch mixers and rotors can be changed in various manners without departing from the scope of this invention. Accordingly, the drawings and description are to be regarded as illustrative in nature and are not to restrict the scope of this invention. Thus, the claims are to be regarded as including such equivalent internal batch mixers and rotors as do not depart from the spirit and scope of this invention.

BRIEF DESCRIPTION OF THE DRAWINGS

FIGS. 4A–4C are unwrapped circumferential envelopes of rotor lobes shown in FIG. 3 included with schematic representations of the type of mixing which occurs from the rotors;

FIGS. 7A–7C are the unwrapped circumferential envelopes shown in FIG. 6 with schematic representations of the type of mixing which occurs through the use of the rotors;

FIGS. 13A–13B are schematics of the orientation of lobes on the rotors shown in FIG. 12 produced by unwrapping the circumferential envelope that contains the rotor lobes;

FIGS. 15A–15B are schematics of the orientation of lobes on the rotors shown in FIG. 14 produced by unwrapping the circumferential envelope that contains the rotor lobes;

FIGS. 20A–20C are the unwrapped circumferential envelopes shown in FIG. 19 with schematic representations of the type of mixing which occurs through the use of the rotors.

DESCRIPTION OF PREFERRED EMBODIMENTS

Figure 1:
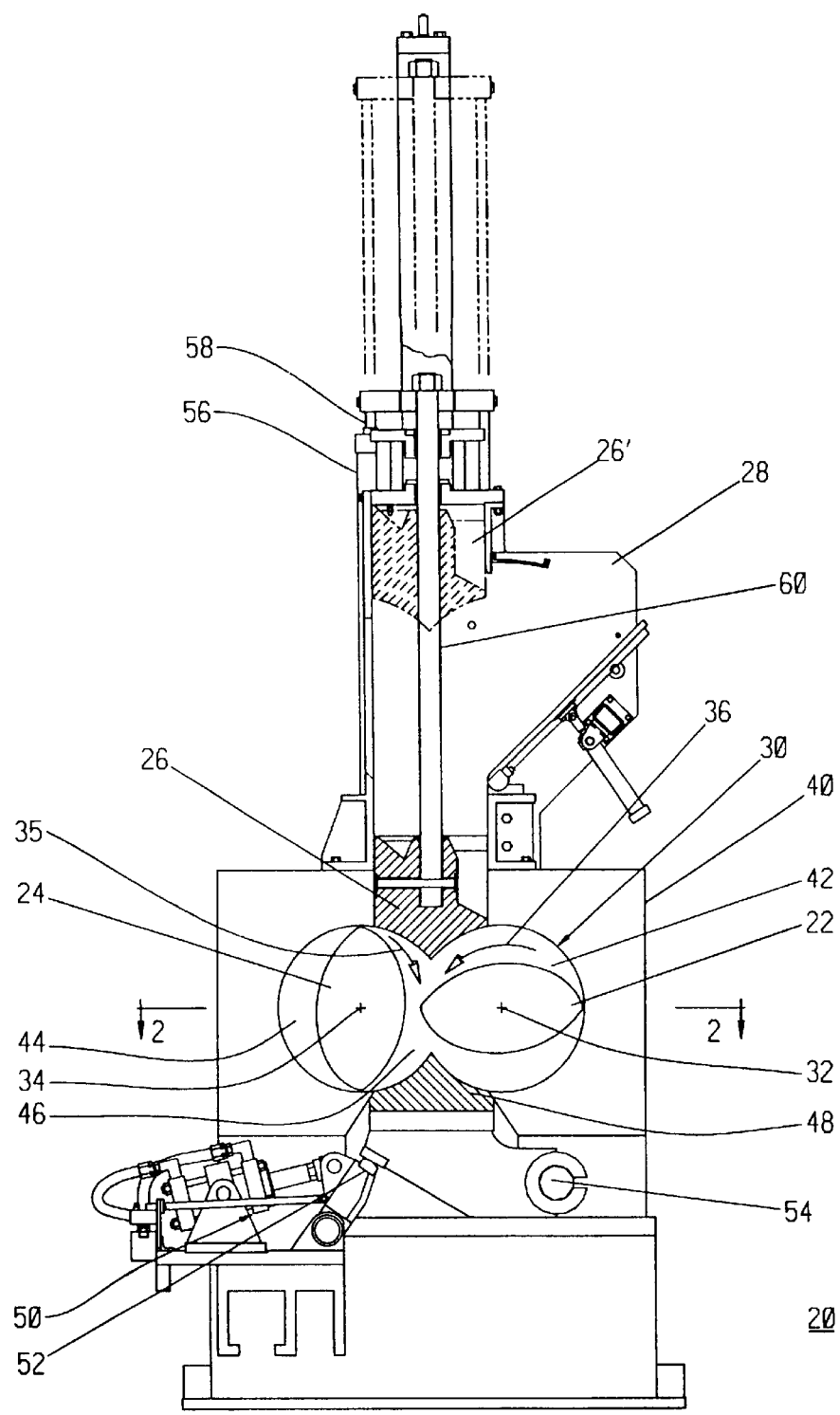
FIG. 1 is a partial cross-section of a schematic view of an internal batch mixing machine constructed according to this invention.

Referring to the drawings, identical reference numbers and letters designate the same or corresponding parts throughout the several figures shown in the drawings.

FIG. 1 shows an internal batch mixing machine 20 of the type described above. The mixing machine 20 includes a pair of rotors 22 and 24 which are constructed in accordance with the principles of this invention. The mixing machine 20 also includes a ram 26 which can reciprocate vertically between a raised position 26', shown in a dashed-outline, and the lowered position shown which is required while the rotors 22 and 24 are mixing materials. The ram 26 is used to move materials to be mixed from a hopper 28 at the inlet of the mixing machine 20 and down into a mixing chamber 30. The mixing chamber 30 is shaped to have the rotors 22 and 24 rotate about parallel, horizontal axes 32 and 34, respectively. In its operating position at which it closes the mixing chamber 30, the ram 26 opposes forces exerted by materials in the mixing chamber 30 as they are being thoroughly and intensively mixed by the rotors 22 and 24.

The rotors 22 and 24 are often referred to as counter-rotating in that they rotate about their horizontal axes 32 and 34, respectively, in opposite directions from one another. This rotation is shown by arrows 35 and 36. The arrow 36 indicates that the right rotor 22 as shown in FIG. 1, rotates in a counter-clockwise direction and the arrow 35 indicates that the left rotor 24 rotates in a clockwise direction.

The mixing chamber 30 is mounted within a housing 40 and has a right cavity 42 in which the right rotor 22 is mounted and a left cavity 44 in which the left rotor 24 is mounted. The cavities 42 and 44 are generally of a circular, cylindrical shape and extend horizontally adjacent one another. A central region 46 is located in the area where the cavities 42 and 44 intersect. This central region 46 forms a window of interaction in the plane where the two rotors 22 and 24 are the closest together as they rotate. The window of interaction consists generally of the space between the bottom of the ram 26 and the top of the door 48 of the mixing chamber 30 between the axes of rotation 32 and 34 which allows material to be transferred between the left cavity and the right cavity during mixing.

Figure 8:
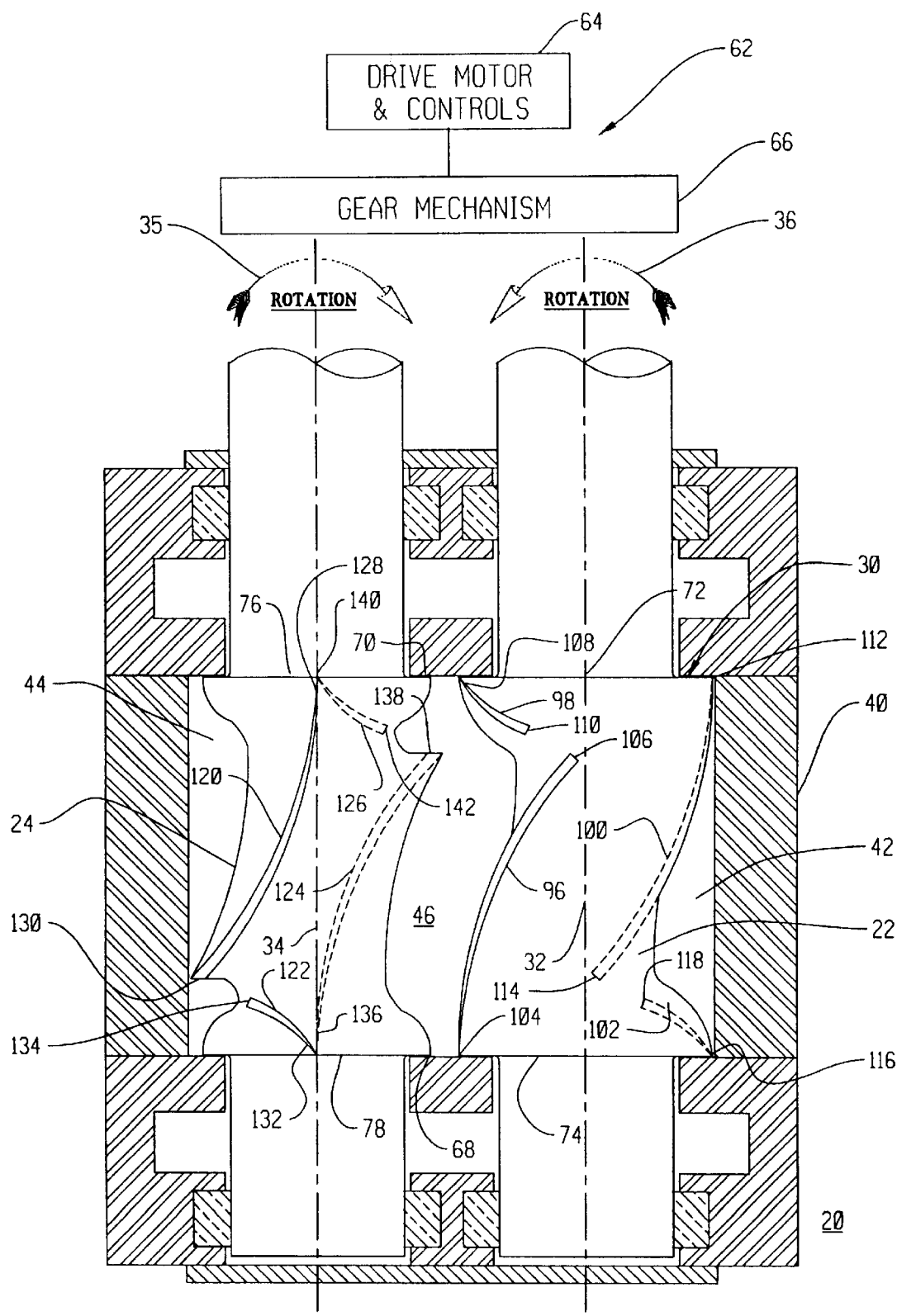
FIG. 8 is a horizontal section showing a pair of rotors constructed and installed in a mixing machine according to this invention.
Figure 9:
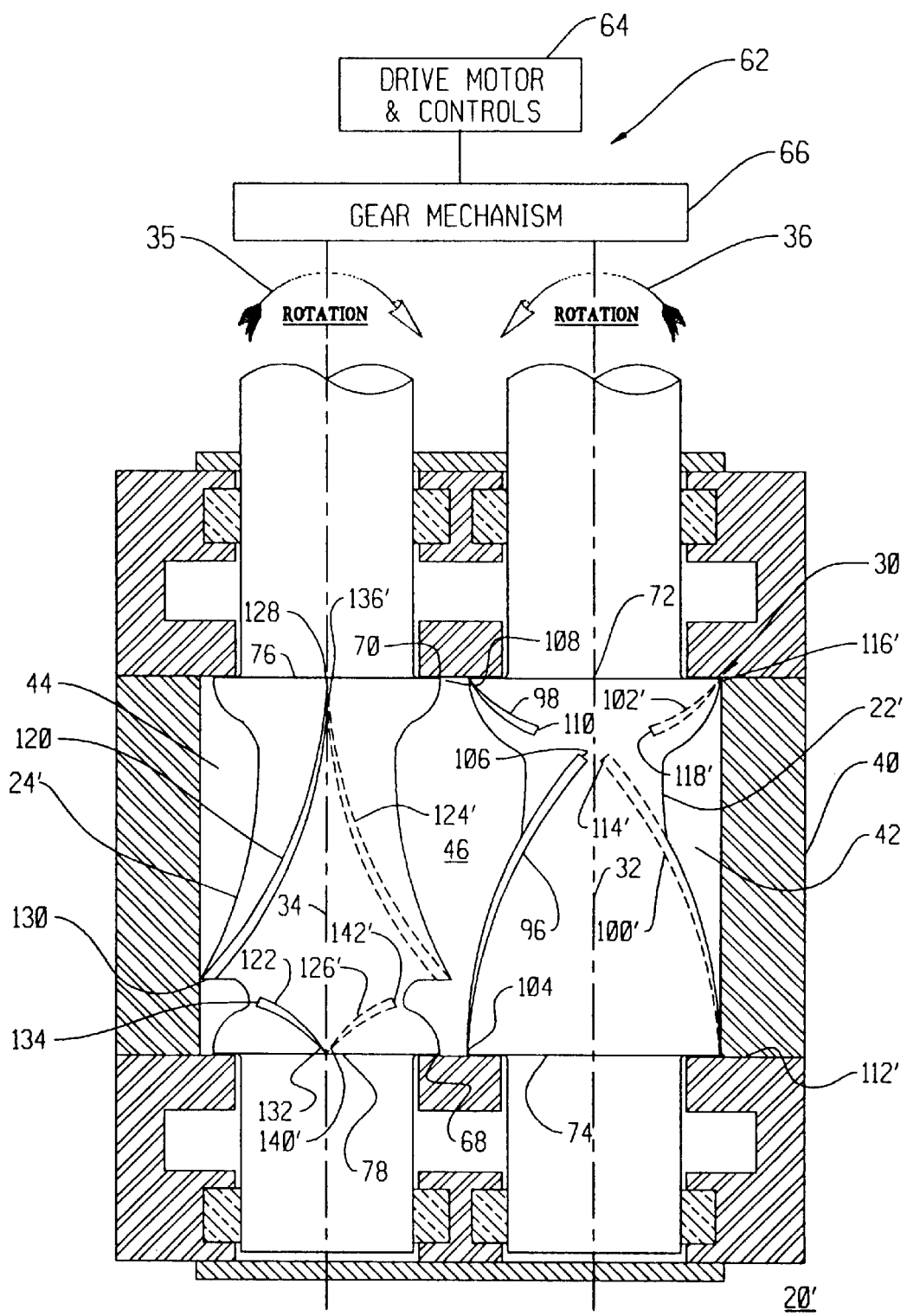
FIG. 9 is a horizontal section showing a pair of rotors constructed and installed in a mixing machine according to this invention.

The rotors 22 and 24 shown in FIG. 1 are in an inter-meshing installation in which the lobes of each rotor fit into spaces between the lobes of the other rotor. While inter-meshing rotor installations are preferred for mixing machines and rotor construction according to this invention, many of the advantages of this invention can also be achieved by installing pairs of rotors constructed in accordance with the principles of this invention as non-intermeshing rotors. That is, in this type of installation the ends of the lobes of each non-intermeshing rotor would not rotate into the space within which the lobes of the other rotor rotate. By way of example see the non-intermeshing arrangement of rotors constructed according to this invention which are shown in FIGS. 8 and 9. It would be particularly advantageous to reconstruct and improve an existing internal batch mixing machine by replacing a pair of non-intermeshing prior art rotors with a pair of non-intermeshing rotors constructed in accordance with the principles of this invention.

The housing 40 of the mixer 20 includes a door 48 which is located at the bottom of the mixing chamber 30. The door 48 is held in a closed position shown in FIG. 1 during the mixing operation by a locking mechanism 50 which includes a latch 52. The door 48 is mounted on a hinge shaft 54. The door can be swung about the hinge shaft 54 by any type of convenient mechanism known to those skilled in the art. One example would be a pair of hydraulic torque motors, one of which could be mounted on opposite ends of the hinge shaft 54. When the locking mechanism 50 retracts the latch 52 from contact with the discharge door 48, the discharge door 48 can be swung away from the bottom of the mixing chamber 30 to allow the mixed materials to drop out of the mixing chamber 30.

The materials to be mixed are initially fed into the hopper 28 while the ram 26 is in its raised position 26'. The materials to be mixed can then enter through the hopper 28 to the inlet of the mixing chamber 30 and into the central region 46 of the mixing chamber 30. The ram 26 is then lowered to the position shown in FIG. 1 to push the materials to be mixed down into the mixing chamber 30 and to retain them in that mixing chamber.

The ram 26 can be operated by any convenient mechanism that can controllably reciprocate it between its raised position 26' and its lowered position. By way of example, the ram 26 is shown to be operated by a fluid-actuated drive cylinder 56 mounted above the housing 40 of the mixing machine 20. The drive cylinder 56 may, for example, be hydraulic or pneumatic. It contains a double acting piston 58 which has a piston rod 60 connected between it and the ram 26 for the purpose of raising and lowering the ram 26. Pressurized actuating fluid, such as oil or air, is fed through a supply line, not shown, into the upper portion of the drive cylinder 56 to force the piston 58 down so as to lower the ram 26 to the operating position shown in FIG. 1. After the mixing operation has been completed, the ram 26 is retracted to its raised position 26' by fluid fed into the lower end of the drive cylinder 56 through a supply line, not shown, below the piston 58.

The structure of the mixing machine shown in FIG. 1 is depicted for illustrative purposes only. Those skilled in the art will recognize that this invention can apply to many other forms of mixing machines, including those having different types of loading and unloading mechanisms. For example, rather than use the ram 26 and the hopper 28 and associated mechanisms for loading the mixing machine, and using the door 48, hinge shaft 54, locking mechanism 50 and latch 52 and associated mechanisms for unloading the mixing machine, the mixing machine could incorporate a mixing chamber which tips to discharge material and uses a pressure lid and vertical sliding shuttle at material supply port to load the mixing chamber or uses a damper chute with a conveyor and bucket at a supply port or fixed vertical chute for loading purposes.

Figure 2:
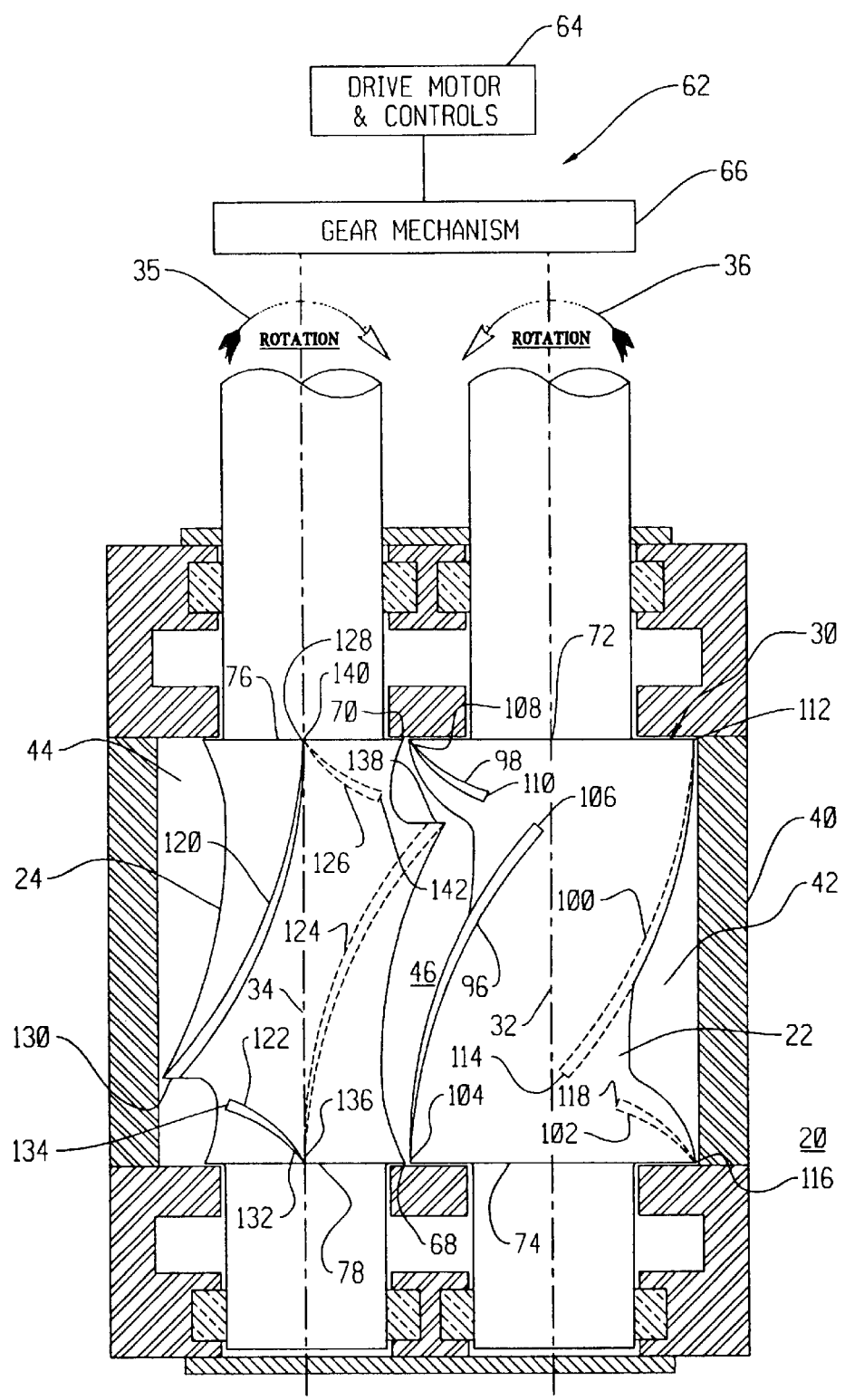
FIG. 2 is a horizontal section along the line 2—2 of the mixing machine shown in FIG. 1.

FIG. 2 is a sectional view of the mixing machine 20 shown in FIG. 1 which is taken along the line 2—2, except that the rotors 22 and 24 are shown in their entirety. The rotors 22 and 24 are rotated in the opposite directions 35 and 36 by a drive system 62 comprising a drive motor and controls 64 and a gear mechanism 66. Preferably, the gear mechanism 66 comprises identical meshing gears for driving rotors 22 and 24 at the same speed, namely a synchronized speed. Alternatively, when non-intermeshing rotors are used, the gear mechanism 66 may comprise meshing gears of somewhat different pitch diameters for driving the rotors at different speeds. The controls for the drive motor enable it to be stopped and started as desired, and they can vary the speed of rotation of the motor and thus the rotors 22 and 24 in accordance with the materials being mixed, their temperature and viscous state and the desired rate of mixing power to be delivered by the rotors. Drive systems of this type are well known to those skilled in the design and manufacture of internal batch mixing machines.

Viewing the mixer 20 from its coolant end, the rotor 22 is rotated in a counter-clockwise direction by the drive system 62, and the rotor 24 is rotated in a clockwise direction. These directions of rotation cause materials to be moved in a downward direction through the central region 46 from the ram 26 shown in FIG. 1 and toward the door 48 at the bottom of the mixer 20. The materials being mixed are moved by the rotors 22 and 24 from the bottom of the mixer 20 and along the inside surface of the right cavity 42 and the left cavity 44 to the top of the mixing chamber 30. This material then goes through the window of interaction between the bottom surface of the ram 26 and the top surface of the door 48.

The structure and operation of the rotors 22 and 24 of this invention are best understood by referring to FIG. 2 along with FIG. 3. The rotor 22 has a first axial end 72, sometimes called the drive end of the rotor, and a second axial end 74, often referred to as the coolant end of the rotor. The rotor 24 has a first axial end, or drive end 76, located adjacent the drive end 72 of the rotor 22. The rotor 24 also has a second axial end, or coolant end 78, which is mounted adjacent the coolant end 74 of the rotor 22.

Figure 3A:
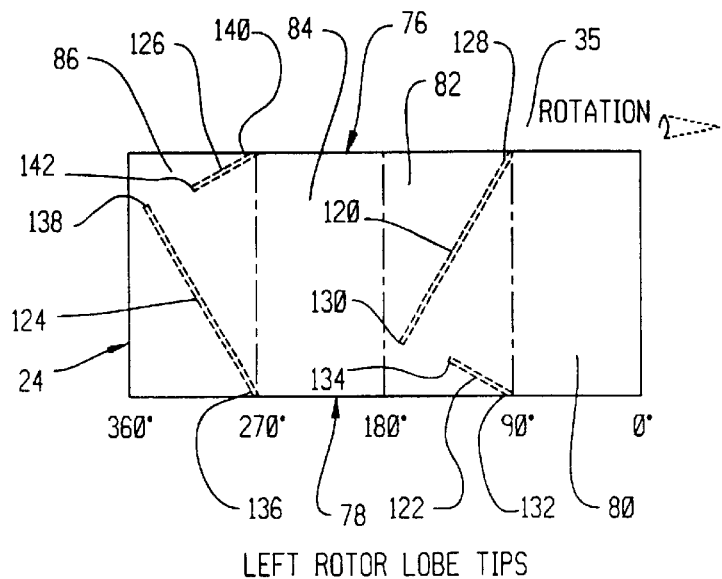
FIGS. 3A–3C are schematics of the orientation of the lobes of the rotors shown in FIG. 2 produced by unwrapping the circumferential envelope that contains the rotor wings.
Figure 3B:
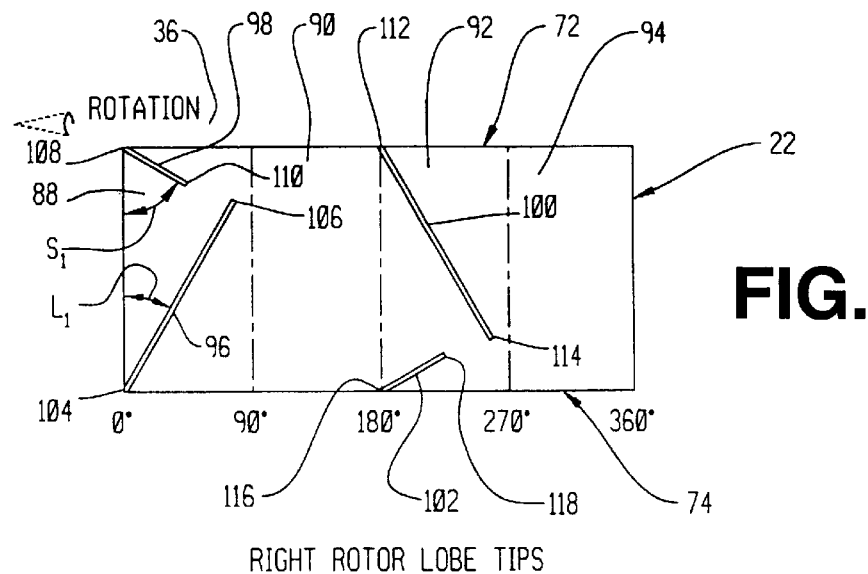
Figure 3C:
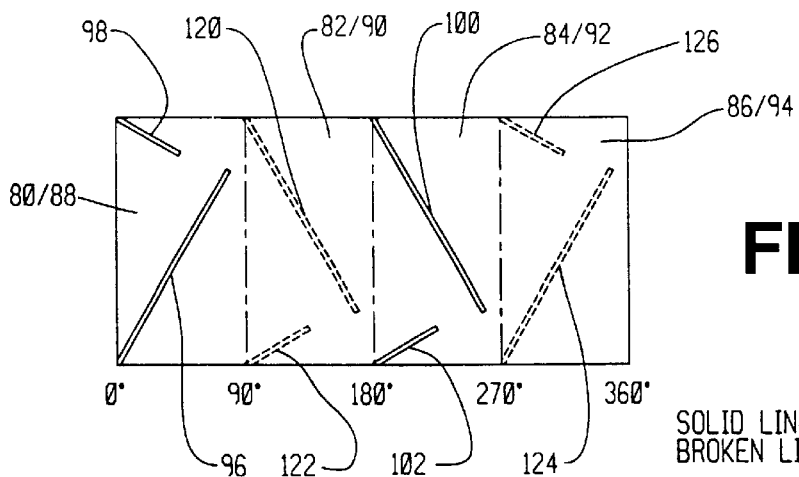

The circumference of each rotor 22 and 24 can be divided into four sequential 90° quadrants which are spaced in a direction opposite to the intended direction of rotation of that rotor. FIG. 3 contains representations of the rotors 22 and 24 with the circumferential envelope of each of the rotors unwrapped and laid out horizontally. The lobes within each rotor are represented for illustrative purposes by rectangles showing the major diameter of each. FIG. 3A shows the left rotor 24, FIG. 3B shows the right rotor 22 and FIG. 3C shows the interaction of the lobe tips of the right rotor and left rotor within the window of interaction as the rotors 22 and 24 revolve about their axes of rotation. Thus, the left rotor 24 has a first quadrant 80, followed by a second quadrant 82, a third quadrant 84 and a fourth quadrant 86 extending sequentially in a counter-clockwise direction. Similarly, the right rotor 22 has a first quadrant 88, a second quadrant 90, a third quadrant 92 and a fourth quadrant 94 extending sequentially in a clockwise direction.

FIG. 3C shows the interaction of the lobes of the right and left rotors of each quadrant as the quadrants of the two rotors 22 and 24 rotate through the window of interaction. The first quadrant 80/88 shown in FIG. 3C is a combination of the first quadrants 80 and 88 of the two rotors which occurs when the first quadrant 88 of rotor 22 near the first quadrant 80 of the rotor 24 when these quadrants of the rotors are between the bottom of the ram 26 and the top of the door 48. This is the position of the rotors 22 and 24 as shown schematically in FIG. 1. Referring again to FIG. 3C, the second quadrant 82/90 is a combination of the second quadrants 82 and 90, the third quadrant 84/92 is a combination of the third quadrants 84 and 92, and the fourth quadrant 86/94 is a combination of the fourth quadrants 86 and 94 of the rotors.

In accordance with one aspect of this invention, each of the rotors 22 and 24 can have a separate pair of lobes located in every other quadrant of the rotor. Thus, the right rotor 22 shown in FIG. 3B has a long lobe 96 and a short lobe 98 located in its first quadrant and a long lobe 100 and a short lobe 102 located in its third quadrant. The lobe 96 has a leading end 104 and a trailing end 106, the lobe 98 has a leading end 108 and a trailing end 110, the lobe 100 has a leading end 112 and a trailing end 114, and the lobe 102 has a leading end 116 and a trailing end 118. Similarly, FIG. 3A shows that left rotor 24 has a long lobe 120 and a short lobe 122 located in its second quadrant and a long lobe 124 and a short lobe 126 located in its fourth quadrant 86. The long lobe 120 has a leading end 128 and a trailing end 130, the short lobe 122 has a leading end 132 and a trailing end 134, the long lobe 124 has a leading end 136 and a trailing end 138, while the short lobe 126 has a leading end 140 and a trailing end 142. The general shape of the various lobes is shown in FIG. 2 with the lobes themselves being represented by their lobe tips. The lobes shown in the preferred embodiments are wings which thus have narrow tips. The lobes or wings shown are of a generally helical or spiral shape as they are formed about the circumference of each of the rotors 22 and 24. When the circumference of the rotor is laid flat, the various tips of lobes become substantially straight lines as shown in FIG. 3. The forms of the lobes, that is wings, which can be used in accordance with this invention is well known to those skilled in the art of designing and constructing internal batch mixing machines.

Each of the lobes on the rotors 22 and 24 has its leading end at an axial end of the rotor on which it is located. Referring to FIGS. 2 and 3B and using the lobes 96 and 98 in the first quadrant 88 of the rotor 22 as the lead pair of lobes, the leading end 104 of the lobe 96 is located at the coolant end 74 of the rotor 22, while the leading end 108 of the lobe 98 is located at the drive end 72 of the rotor 22. The positions of the leading ends 104 and 108 and their respective longer lobes 96 and 100 could be reversed, if desired, along with the positions of the leading ends 108 and 116 of the shorter lobes 98 and 102. However, it is preferable to have the leading ends 104 and 112, respectively, of the long lobes 96 and 100 located at opposite axial ends of the rotor 22.

Regardless of the actual axial ends at which the leading end 104 and 112 are located, the longer lobes in the second quadrant 82 and the fourth quadrant 86 of the left rotor 24 must have their leading ends preferably located, respectively, at the axial ends of the left rotor 24 which are the opposite from the axial ends at which the longer lobes in the first and third quadrant have their respective leading ends. Thus, the longer lobe 96 in the first quadrant 88 of the right rotor 22 has its leading end 104 at the coolant end 74 of that rotor. The longer lobe 120 in the second quadrant 82 of the left rotor 24 must have its leading end 128 located at the drive end 76 of that rotor. Similarly, the long lobe 100 located in the third quadrant 92 of the rotor 22 has its leading end 112 at the drive end 72 of the rotor 22. Thus the long lobe 124 located in the fourth quadrant 86 of the left rotor 24 has its leading end 136 at a position on the coolant end 78 of that rotor.

Each of the lobes 96, 98, 100, 102, 120, 122, 124 and 126 extends in a direction opposite to the intended direction of rotation of the rotor on which it is mounted. The extension of each lobe is at an acute angle with respect to a line through the leading end of the lobe which is parallel to the axis of rotation of that rotor. As shown in FIG. 3B, the acute angle $L_1$ of the longer lobe 96 is smaller than the acute angle S, of the shorter lobe 98. In the preferred embodiment shown in FIG. 3B the longer lobes 96 and 100 on rotor 22 extend in a clockwise direction at the angle $L_1$, while the shorter lobes 98 and 102 extend on that rotor in a clockwise direction at the angle $S_1$. On the rotor 24 shown in FIG. 3A, each of the long lobes 120 and 124 extends in a counter-clockwise direction at the angle $L_1$, while each of the short lobes 122 and 126 extends in a counter-clockwise direction at the angle $S_1$.

The lobes of each pair of lobes must have respective lengths, locations of origin within the quadrant of the rotor on which the lobes are located and acute cohelix angles at which they extend to cause material adjacent the leading side of the longer lobes of each pair of lobes to be pushed away from the axial ends at which the longer lobes leading end is located and toward the other axial end of that rotor. These respective lengths, locations of origin and acute cohelix angles of each pair of lobes also form a space between the trailing ends of these lobes of appropriate dimensions to enable material adjacent the leading sides of both of the lobes to be squeezed between them and compressed. The material then flows out of the space between the trailing ends of both of these lobes relieving the compression and causing a turbulence which enhances the mixing of the material.

The type of mixing which results from the use of rotors constructed in accordance with the principles of this invention is best understood by referring to FIGS. 4A–4C and the notations beneath these figures. FIGS. 4A–4C are identical to FIGS. 3A–3C, except for the various arrows showing the type of material flow included in the operation of rotors constructed in accordance with this invention within a mixing machine. Referring first to the first quadrant 88 of the rotor 22 shown in FIG. 4B, the arrow along the leading side of the long lobe 96, that is the side of this lobe which faces the direction of rotation, shows that this lobe causes distributive mixing or blending by producing a rolling bank of material which moves axially from the cooling end 74 of the rotor 22 toward the drive end 72 of that rotor. As the rolling bank of material approaches the space between the long lobe 96 and short lobe 98, the material is joined by material flowing along the leading side of the short lobe 98. In this area, the material is squeezed and compressed. This material then flows through the space between the trailing ends of the lobes 96 and 98 where the compression of the material due to the squeezing is relieved, causing an additional turbulence with respect to that material which enhances the mixing of the ingredients to the material. The circular arrows shown over the tips of each of the lobes indicate that a certain portion of the material at the leading sides of the lobes 96 and 98 goes through high shear as it passes between the top surfaces of the lobes and the internal surface of the mixing chamber 30.

The long arrow extending from between the lobes 96 and 98 is a representation that material passing between these lobes flows toward the leading side of the lobe 100 near the drive end 72. This material then becomes part of a rolling bank which is further mixed or blended as it is driven along the leading side of the long lobe 100 toward the coolant end 74 of the right rotor 22. Some of that material also goes through high shear as it passes between the top surface of the lobe 100 and internal surface of the cavity 42 of the mixing chamber 30. The balance of the material in the rolling bank approaches the space between the long lobe 100 and the short lobe 102. In this area this material is joined by material flowing along the leading side of the short lobe 102 where the material is squeezed and compressed. This material then flows through the space between the trailing edges of the lobes 100 and 102. The compression of the material due to squeezing is relieved, again causing additional turbulence that enhances the mixing of the material. A similar action takes place among the lobes on the surface of the left rotor 24 as it rotates adjacent the internal surface of the mixing chamber 30 as shown in FIG. 4A.

The flow of material within the window of interaction between the lobes on the right rotor 22 and the lobes on the left rotor 24 is shown in FIG. 4C. The rolling bank of material flows along the leading side of the long lobe 96 in a manner similar to the flow shown in FIG. 4B. However, within the window of interaction the lobes are not adjacent the inner surface of the cavities of the mixing chamber 30, and thus the high intensive shear mixing shown in FIG. 4B does not occur when some material flows over the top of the lobe. However, within the window of interaction the rolling bank of material adjacent the leading end of the lobe 96 joins that from the rolling bank of material adjacent the lobe 98 to cause the squeezing or compression of the material described above which is relieved as material passes through the space between the lobes 96 and 98. This material is affected by the long lobe 120 as the second quadrant of each rotor enters the window of interaction. It becomes a rolling bank of material which flows along the leading surface of the lobe 120 toward the space between this lobe and the short lobe 122. Within that area, the material from the rolling banks along the lobes 120 and 122 experiences the squeeze flow and relief as it passes through the space between these lobes. It then joins the rolling banks of material in the third quadrant at the area approaching the space between the lobes 100 and 102. This material also goes through the squeeze flow and relief as it passes through the space between these lobes.

Thereafter, the fourth quadrant of each of the rotors 22 and 24 enters the window of interaction. The material which experienced the turbulent mixing through the space between the lobes 100 and 102 becomes a part of the rolling bank of material that moves along the leading side of the lobe 124 toward the space between the lobes 124 and 126. After it passes through that space and undergoes a squeeze flow and relief of the pressure built up, the first quadrant enters the window of interaction once again. This high intensive mixing within the window of interaction results in a complete transverse of the material with respect to the lobes that causes the efficient transfer of material from one rotor to the other as the lobes on each rotate through the window of interaction.

Figure 17:
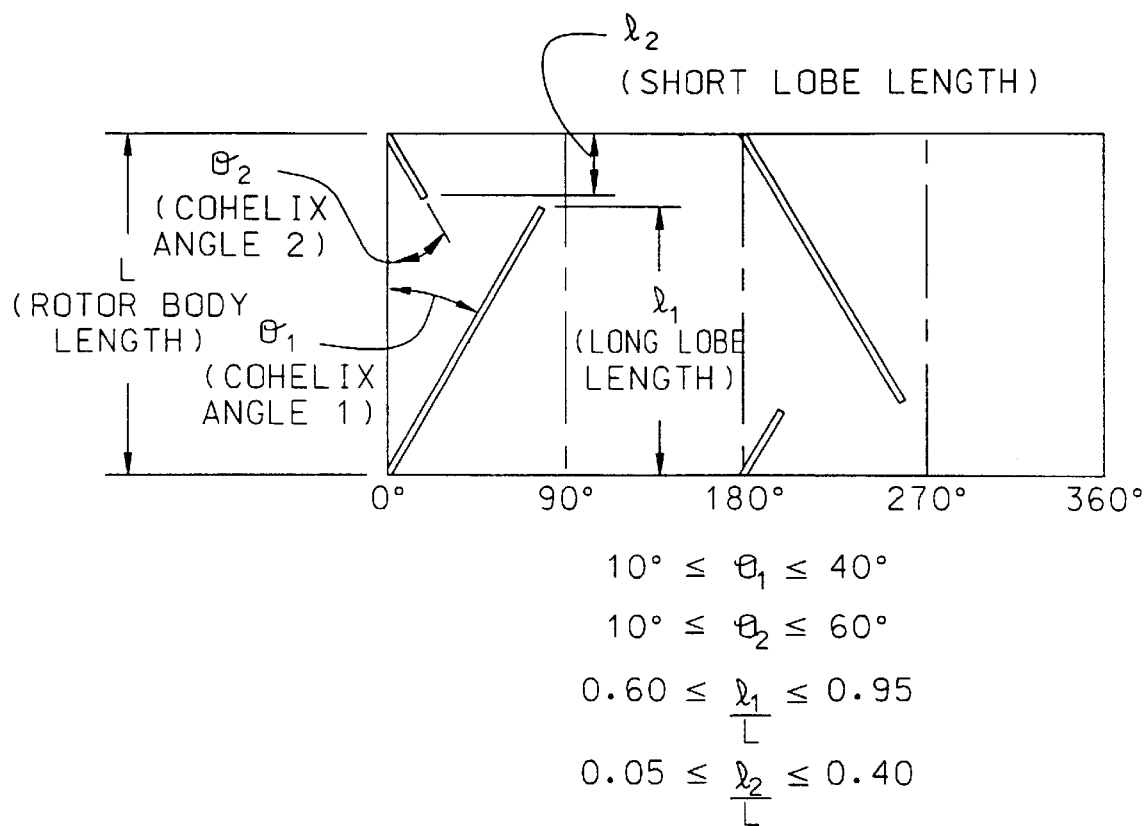
FIG. 17 is a schematic of an unwrapped circumferential envelope of a rotor showing the approximate ranges of variation of the acute angles and lengths of the lobes.
Figure 18:
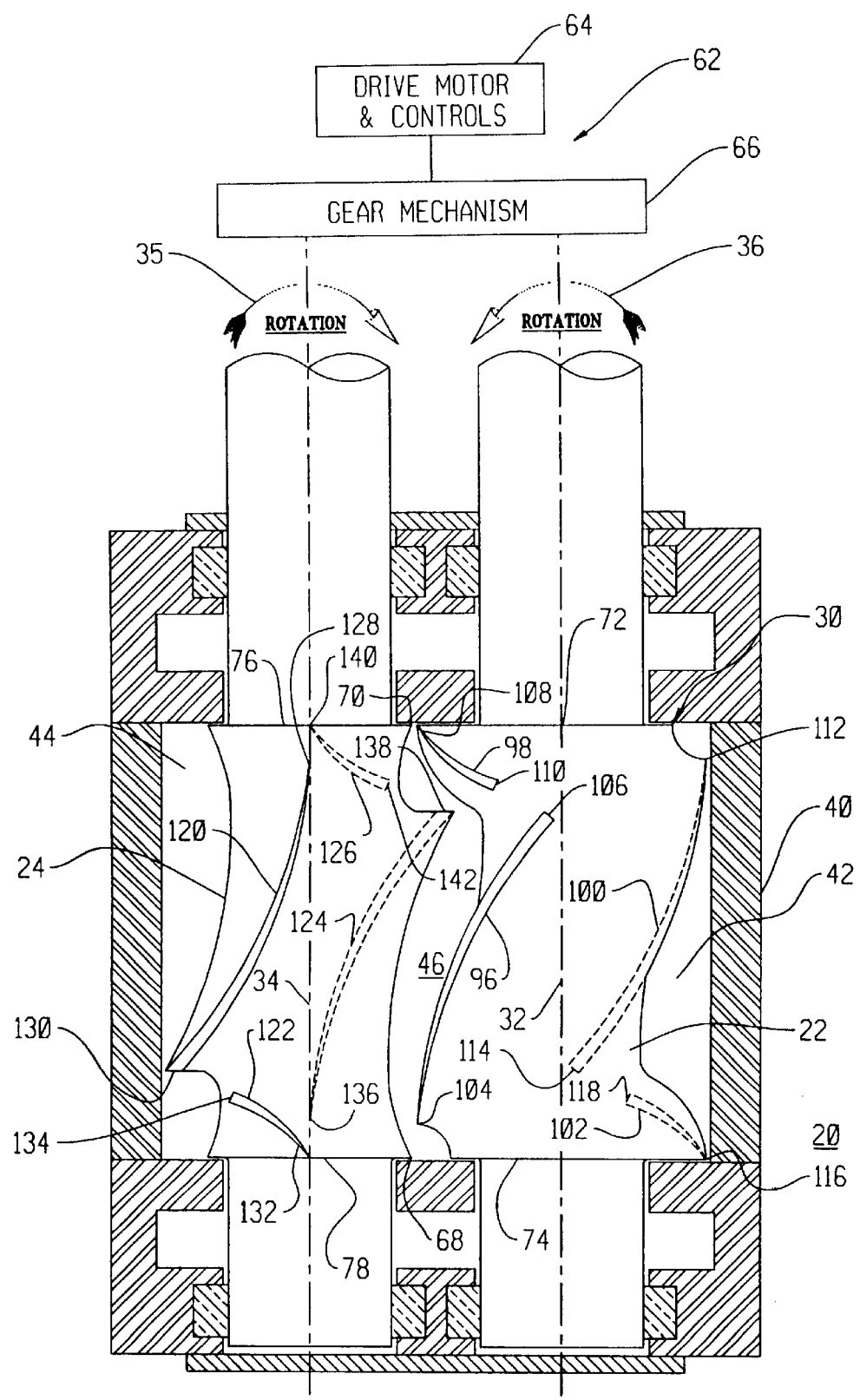
FIG. 18 is a horizontal section of a mixing machine showing a pair of rotors constructed and installed in a mixing machine according to another aspect of this invention.

The material flow back and forth from one axial end of the rotors 22 and 24 to the other and the squeezing of the material and the relief the material experiences as it passes through the space between the trailing ends of a long lobe and a short lobe can be accomplished using lobes having the approximate range of lengths described in FIG. 17 and using lobes oriented within the approximate range of acute cohelix angles $\theta_1$ and $\theta_2$ shown in FIG. 17. As can be seen in FIG. 17, the axial length of the long lobe $1_1$ should not be any less than about 0.6 times the total rotor body length L, nor should it be any more than about 0.95 times the total rotor body length L. However, it is preferable to have the axial length of the long lobe between about 0.7 and about 0.8 times the total rotor body length. Likewise, the axial length of the short lobe $1_2$ should not be any less than about 0.05 times the total rotor body length L, nor should it be any more than about 0.4 times the total body length L. It is preferable to have the axial length of the short lobe between about 0.1 and about 0.15 times the total rotor body length.

Accordingly, as can be seen in FIG. 3B, the short lobes 98 and 102 of the right rotor 22, and, as can be seen in FIG. 3A, the short lobes 122 and 126 of the left rotor 24, are maintained at an acute cohelix angle $S_1$ with a line parallel with the axis of rotation. This acute cohelix angle $S_1$ would equal $\theta_2$ shown in FIG. 17 and should not be any less than about 10° nor be any more than about 40°. Also, as can be seen in FIG. 3B, long lobes 96 and 100 of the right rotor 22, and as can be seen in FIG. 3A, long lobes 120 and 124 of the left rotor 24, are maintained at an acute cohelix angle $L_1$. The cohelix angle $L_1$ would equal $\theta_1$ shown in FIG. 17 and should not be any less than about 10° nor be any more than about 60°. In one preferred embodiment of this invention where a uniform shear rate is desired over the tips of long wings as well as the tips of short wings, the same cohelix angle is used for both long and short wings. The use of equal cohelix angles $\theta_1$ and $\theta_2$, as shown in FIG. 17, allows the squeeze-flow effect within each chamber to be minimized and the relief effect to be maximized. It is preferable to have the cohelix angles between about 25° and about 35°.

The same approximate ranges of the corresponding cohelix angles and the same approximate ranges of ratios of the length of the corresponding long and short lobes to the total length of the rotor apply to the lobes in other embodiments of this invention described below.

The long lobe and the short lobe in each quadrant are shown in FIGS. 2–4 as having their leading ends at the same circumferential position on the rotor, and having both of their leading ends at an axial end of the rotor. However, it is intended that the rotors and the internal batch mixing machines of this invention will be used to mix various types of material. Thus, those skilled in the art may find it advantageous to have the leading ends of the short lobe and the long lobe offset circumferentially with respect to one another. Additionally, the leading ends of the lobes do not necessarily have to be at an axial end of the rotor on which the lobes are mounted. By way of example, see FIGS. 19A–19C and 20A–20C in which the leading ends of the long lobes are not at the axial ends of the rotors on which these lobes are mounted. Thus, a rotor constructed according to this invention has the long lobe of each pair of lobes with its leading end located in one of the two axial halves of the quadrant of the rotor in which the long lobe is located. The rotor has the short lobe of each pair of lobes with its leading end located in the second of the two axial halves of the quadrant in which the short lobe is located. Each of the lobes of each pair of lobes extends downstream at an acute cohelix angle toward the other lobe of that pair of lobes. The respective lengths, locations of leading ends of the lobes and acute cohelix angles at which the lobes extend cause the material to be pushed from one axial end of the rotor toward the other and cause the material flowing adjacent each lobe of each pair of lobes to become confluent. The space between the trailing ends of each pair of lobes causes the confluent material to be squeezed between these trailing ends. This builds up a pressure which is reduced as the material flows from the space, causing a turbulence which enhances the mixing of the material.

Figure 5:
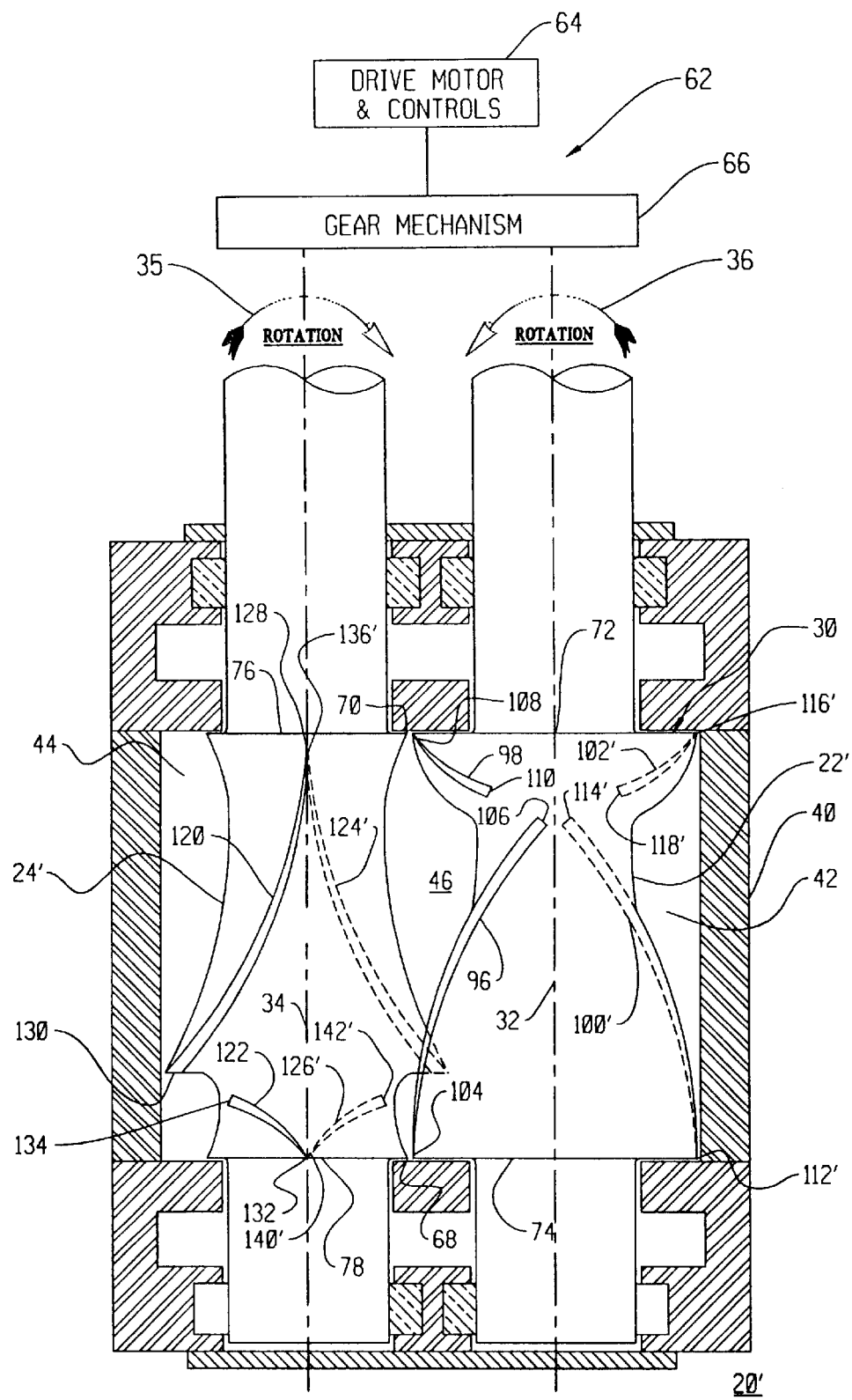
FIG. 5 is a horizontal section of a mixing machine showing rotors constructed in accordance with this invention.

FIG. 5 shows a partially schematic horizontal section of another embodiment of this invention applied to an internal batch mixing machine 20' having a pair of intermeshing rotors 22' and 24'. Unwrapped circumferential envelopes of the rotors 22' and 24' are shown in FIGS. 6A–6C and in FIGS. 7A–7C, which also show the types of flow and mixing that takes place as the rotors 22' and 24' rotate.

The right rotor 22' and left rotor 24' of the mixing machine 20' are identical to the rotors 22 and 24 shown in FIGS. 2–4, except for the positions of the pairs of lobes in the third quadrant of the right rotor 22' and in the fourth quadrant of the left rotor 24'. Thus, all of the components of the internal batch mixing machine 20' shown in FIG. 5 will be marked with the same numerals as the internal batch mixing machine 20 shown in FIG. 2, except for the lobes located in the third quadrant of the right rotor 22' and in the fourth quadrant of the left rotor 24'.

In accordance with this embodiment of the invention the two long lobes of each rotor have their leading ends on the same axial end of that rotor. As a result, the two small lobes located on each rotor have their leading ends on the same axial end of the rotor, as well. Thus, both long lobes 96 and 100' have their respective leading ends 104 and 112' at the coolant end 74 of the right rotor 22', and both short lobes 98 and 102' have their respective leading ends 108 and 116' located on the drive end 72 of the right rotor 22'. Similarly the long lobes 120 and 124' have their respective leading ends 128 and 136' located on the drive end 76 of the left rotor 24', while the short lobes 122 and 126' have their leading ends 132 and 140' located on the coolant end 78 of the left rotor 24'.

Figure 6A:
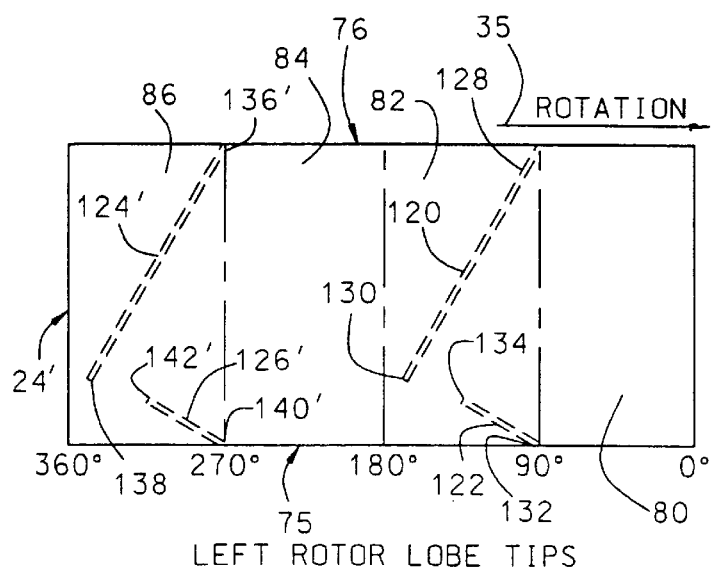
FIGS. 6A–6C are schematics of the orientation of the lobes of the rotors shown in FIG. 5 produced by unwrapping the circumferential envelope that contains the rotor lobes.
Figure 6B:
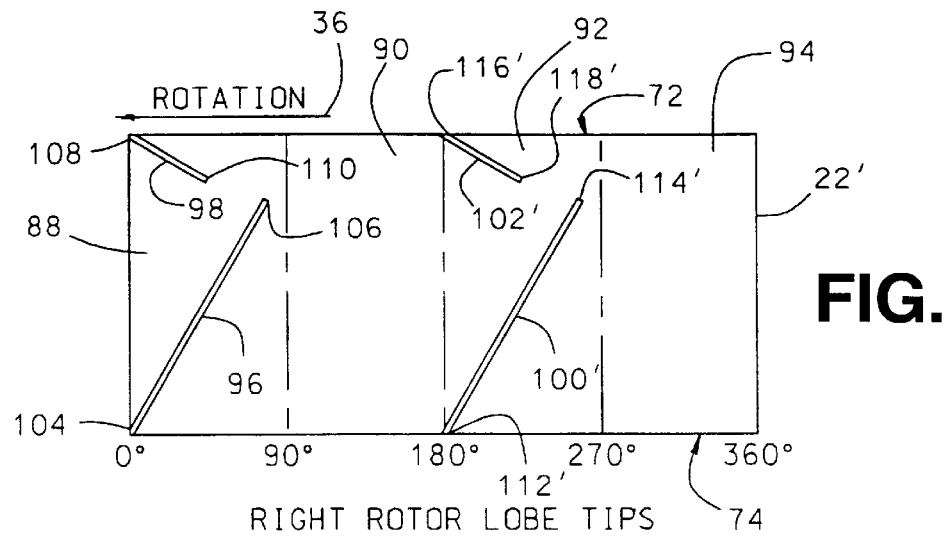
Figure 6C:
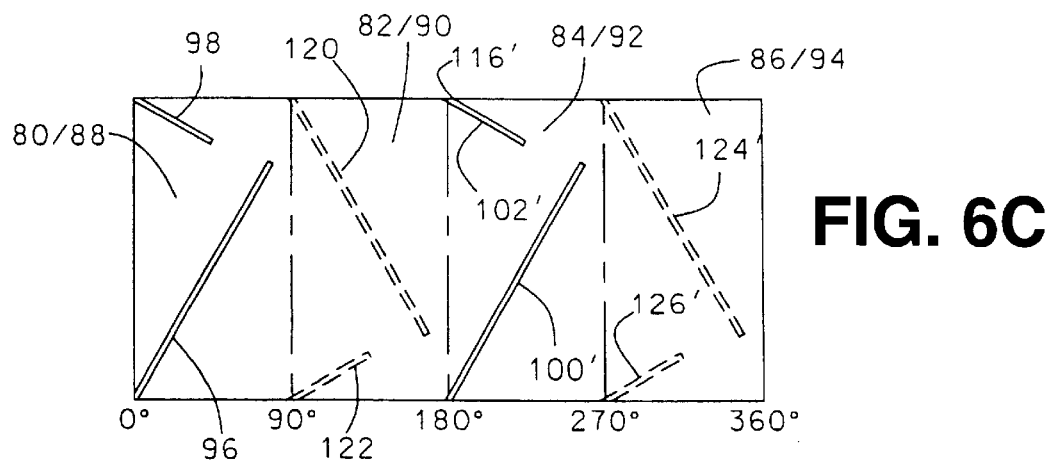

As shown in FIGS. 6A and 6B, the result of having all the long lobes on a rotor originate at one axial end of the rotor and all the short lobes interact at the other axial end of the rotor is an unsymmetrical flow pattern with respect to each rotor 22' and 24' individually. For example, FIG. 7B shows material flowing through the space between the long lobe 96 and the short lobe 98 at which it is subject to the enhanced mixing as a result of the squeeze flow and relief. This material flows almost directly toward the space between the long lobe 100' and the short lobe 102'. This flow path decreases the extent of the mixing which takes place in comparison with the mixing accomplished by the rotors 22 and 24 shown in FIGS. 2–4.

However, FIG. 7C shows that in the window of interaction, the mixing which takes place becomes more symmetrical. The material which flows in the window of interaction from between the lobes 96 and 98 then flows in a downward direction along the leading side of the lobe 120 toward the coolant ends of the rotors. It then flows through the space between the lobes 120 and 122. Thereafter it flows along the leading side of the lobe 102' and through the space between the trailing ends of the lobes 100' and 102' to the leading side of the lobe 124'. Material then flows toward and through the opening between the trailing ends of the lobes 124' and 126'. In the course of this movement, the material experiences squeeze flow and relief creating a turbulence which enhances the mixture of this material each time the material passes through a pair of lobes.

FIG. 8 is a horizontal section of a schematic of an internal batch mixing machine of the type shown in FIG. 2 in which the rotors 22 and 24 are installed in a manner such that they are non-intermeshing. These rotors will provide the same type of mixing caused by the intermeshing rotors shown in FIG. 2, except that there will be only a partial transfer of material from rotor to rotor in the central region 46 as the rotors rotate tangentially through the window of interaction. However, enhanced mixing is experienced in the central region 46 in comparison with prior art non-intermeshing mixers. This is due to the squeeze flow and relief brought about by the non-intermeshing rotors both in the window of interaction between the rotors and during the course of the balance the rotation of these rotors adjacent the inside surfaces of the cavities 42 and 44 of the mixing chamber 30.

FIG. 9 shows a horizontal section of a schematic diagram showing an internal batch mixing machine having a pair of non-intermeshing rotors which are constructed in accordance with the configuration of lobes shown in FIG. 5. The statements made with regard to the non-intermeshing rotors shown in FIG. 8 apply equally to the non-intermeshing rotors shown in FIG. 9.

Figure 10A:
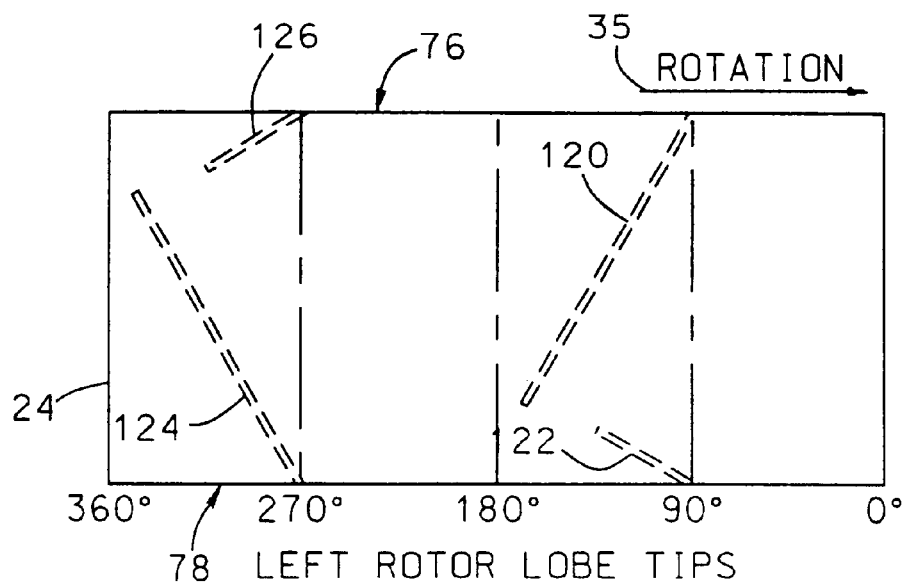
FIGS. 10A–10B are schematics of the orientation of the lobes of rotors constructed according to this invention produced by unwrapping the circumferential envelope that contains the rotor lobes.
Figure 10B:
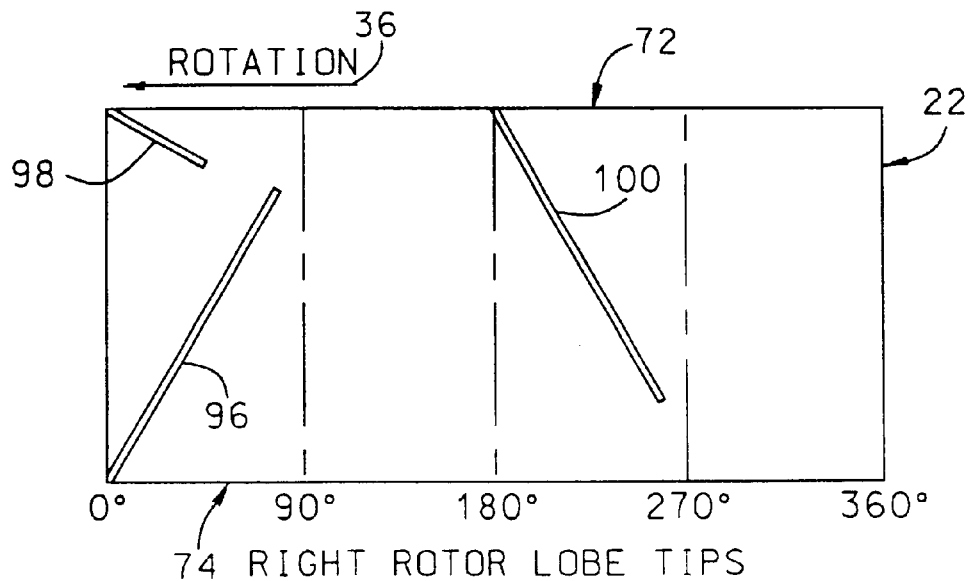
Figure 11A:
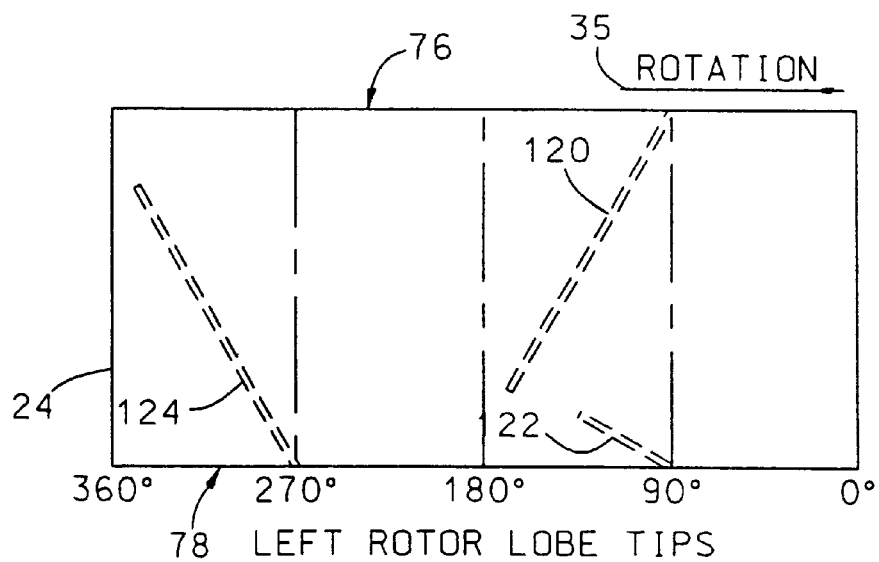
FIGS. 11A–11B are schematics of the orientation of the lobes of rotors constructed according to this invention produced by unwrapping the circumferential envelope that contains the rotor lobes.
Figure 11B:
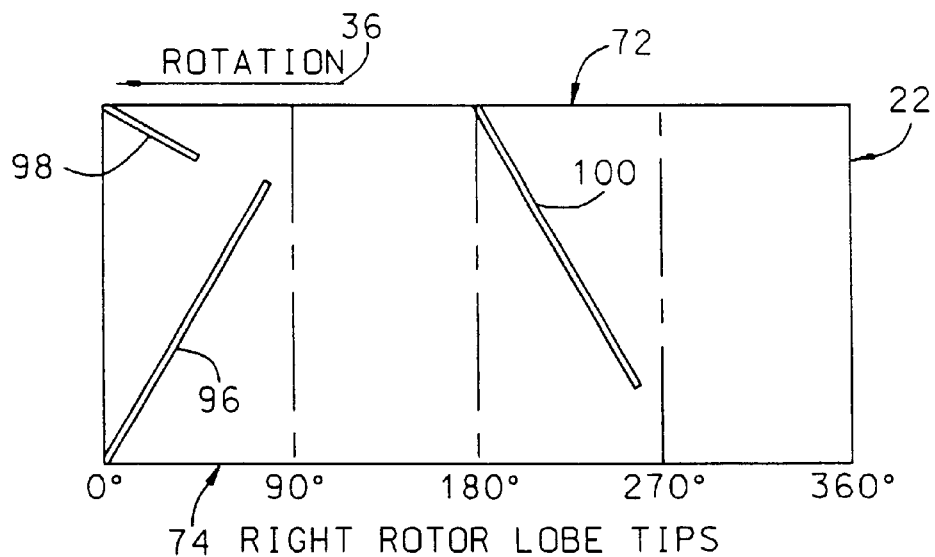

This invention can be used to construct internal batch mixing machines having three lobes on one or both of the rotors. As shown in FIGS. 10 and 11, this is accomplished by eliminating one of the short lobes from one or both of the rotors 22 and 24. In FIG. 10 the short lobe 102 has been eliminated from the third quadrant of the right rotor 22. In FIG. 11 both the short lobe 102 and the short lobe 122 in the fourth quadrant of the rotor 24 have been removed. If desired, one short lobe could be eliminated from one quadrant in one or in both the rotors. The result is that the squeeze flow and relief that occurs between the trailing ends of the long and the short lobes according to this invention takes place only in one quadrant on a rotor having three lobes. However, the existence of the squeeze flow and relief caused by the pair of long and short lobes located in at least one quadrant of the rotor enhances the operation of that rotor in comparison to the operation of prior art rotors.

Figure 12:
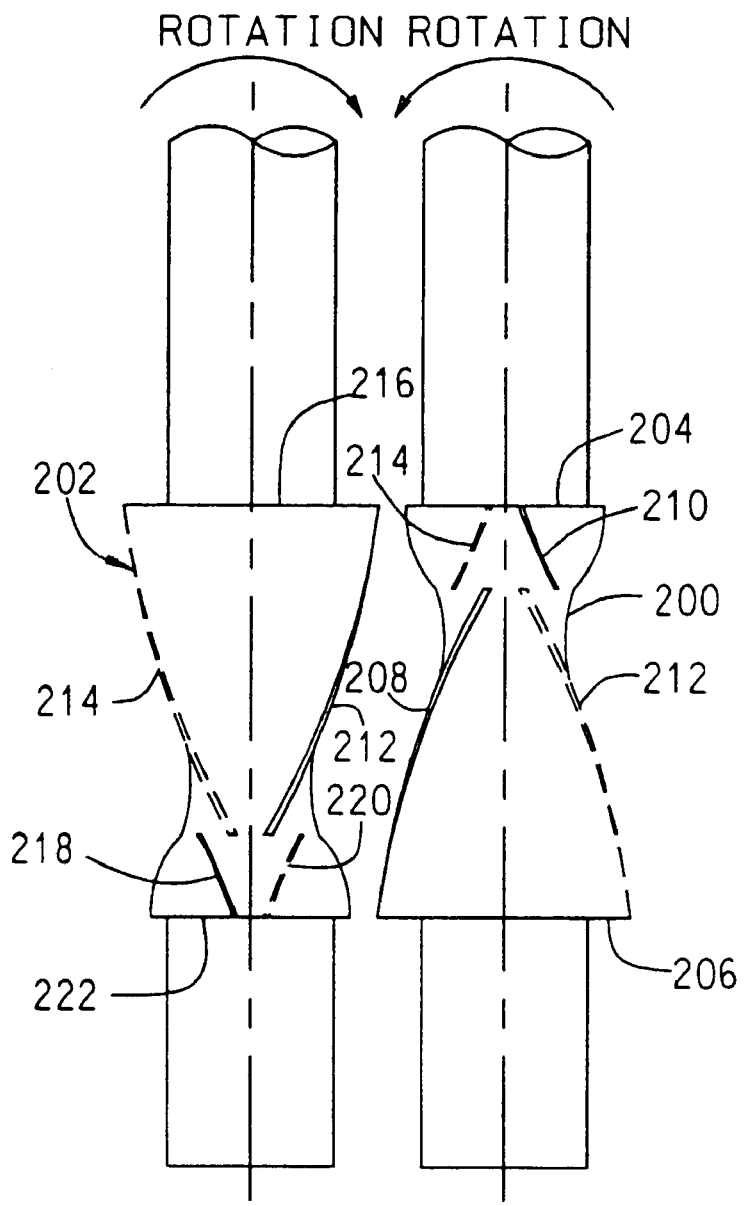
FIG. 12 shows the arrangement of wings on a pair of prior art rotors.

U.S. Pat. No. 4,284,358 discloses a prior art internal batch mixing machine using a pair of counter-rotating rotors having wing configurations depicted in FIG. 12 and in the unwrapped circumferential envelopes shown in FIGS. 13A and 13B. These prior art rotors 200 and 202 can only be used in a non-intermeshing or tangential installation due to the placement and configuration of the wings which are shown on the rotors. The rotor 200 has a driving end 204 and a coolant end 206. In the first quadrant of that rotor a long wing 208 originates from the coolant end 206. A short wing 210 originates in the second quadrant from the drive end 204, with the point of origination at approximately 115° along the circumference of the rotor. A long wing 212 originates in the third quadrant of the right rotor 200 at the coolant end 206, while a short wing 214 originates in the fourth quadrant at the drive end of the rotor 200. The short wing 214 is offset from the start of the fourth quadrant by approximately the same 25° as the short wing 210 is offset from the start of the second quadrant.

The wings on the rotor 202 are positioned with respect to the direction of rotation of that rotor in the same manner as the wings of the right rotor 200. However, both of the long wings 212 and 214 originate at the driving end 216 of the rotor 202, while the short wings 218 and 220 originate from the coolant end 222. The long wing 212 is located in the first quadrant of the rotor 202, the short wing 218 is located in the second quadrant of that rotor, the long wing 214 is located in the third quadrant and the short wing 220 is located in the fourth quadrant of that rotor. The short wings 218 and 220 are offset with regard to the start of the second and fourth quadrants, respectively, by the same approximately 25° as the short wings 210 and 214 are offset as shown in FIG. 13B.

FIGS. 13A and 13B show the types of mixing which take place within the prior art mixer shown in U.S. Pat. No. 4,284,358 as the rotors 200 and 202 rotate. Referring to FIG. 13B with respect to the right rotor 200, the rolling bank of material flows along the lead surface of the wing 208 and toward the driving end 204 of that rotor. The circular arrows show that high shear mixing takes place as some of the material passes over the tips of the rotor wings. However, as the rolling bank of material approaches the driving end 204 it is reflected from the driving end 204 and toward the short wing 210 where it joins the rolling bank of material formed along the leading side of the short wing 210. However, a squeeze flow and relief does not occur as the material passes from the leading side of the long lobe 208 to the leading side of the short lobe 210. The short lobe 210 has been offset to minimize or eliminate a blockage or choking of the flow which has been known to occur in prior art rotors in the area between large wings and short wings such as the wings 208 and 210. Prior to this invention it was thought that the flow of material would be choked if a long lobe and a short lobe were placed on opposite axial ends of a rotor and within or very close to the same quadrant of that rotor. The rotors 200 and 202 were developed with that concept in mind.

Continuing with respect to FIG. 13B, the material which leaves the rolling bank at the leading side of short wing 210 travels toward the leading side of the long lobe 212 where it becomes a part of the rolling bank of material adjacent the leading side of that lobe. This material then flows past the driving end 204 and the short lobe 214 in the same manner that the material in the rolling bank adjacent the leading side of the long lobe 208 flowed past the driving end 204 and the short lobe 210.

FIG. 13A shows that the flow of material with respect to the left rotor 202 is the same as described above with regard to the right rotor 200. The result is a degree of mixing which has been satisfactory in the past, but is not as intensive and effective as that produced in accordance with this invention. The prior art rotors shown in FIGS. 12 and 13 do not produce the increased turbulence caused by the squeeze flow and relief produced by pairs of lobes in accordance with the design and principles of this invention. Additionally, there is a less efficient transfer of material between rotors in the central area between the rotors 200 and 202 since these rotors are not intermeshing.

Figure 14:
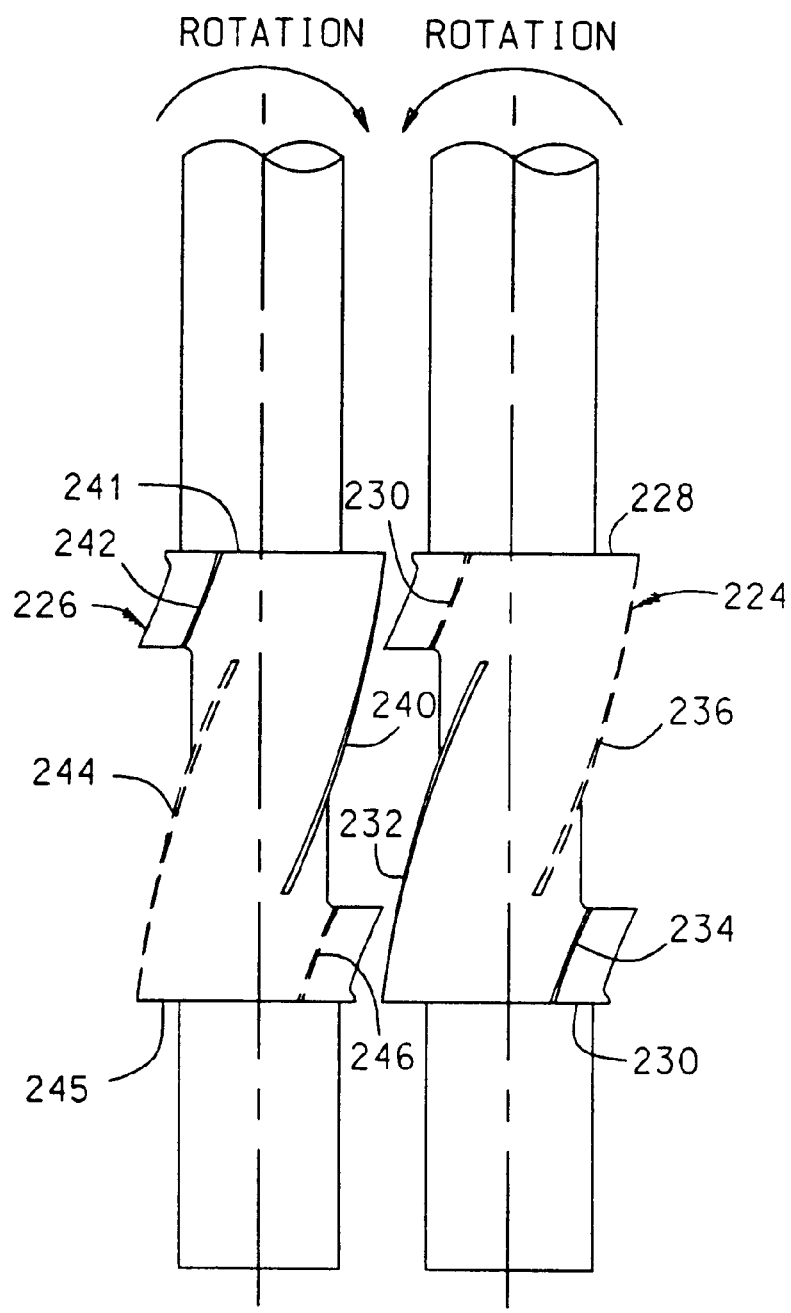
FIG. 14 shows the arrangement of wings on a pair of prior art rotors.

U.S. Pat. No. 4,834,543 shows another prior art internal batch mixing machine. FIG. 14 shows a pair of counter-rotating rotors having wing configurations shown in that patent, and FIG. 13A and 13B are unwrapped circumferential envelopes depicting the lobes shown in that patent. These rotors 224 and 226 can only be installed in non-intermeshing installations. The rotor 224 has a driving end 228 and a coolant end 230. It has a long wing 232 in its first quadrant originating from the coolant end 230. A short wing 234 originates at approximately the mid point of the second quadrant at the coolant end 230, a long wing 236 originates in the third quadrant at the drive end 228 and a short wing 238 originates at approximately mid point of the fourth quadrant of the drive end of the rotor 224.

The left rotor 226 has its wings positioned with respect to the direction of rotation of that rotor in the same manner that the wings of the right rotor 224 are positioned. However, the wings located in the respective quadrants of the left rotor originate at the opposite end of the rotor 226 from the location of origin of wings in corresponding quadrants of the rotor 224. Thus, long wing 240 originates from the driving end 241 in the first quadrant of the rotor 226, while short wing 242 originates from the same end of that rotor at approximately the mid point of that rotor's second quadrant. Long wing 242 originates at coolant end 245 of the left rotor 226, while short wing 246 originates at the coolant end 245, at approximately mid point of that quadrant.

The mixing which takes places within the prior art mixers shown in U.S. Pat. No. 4,834,543 due to the rotation of the rotors 224 and 226 is shown in FIGS. 15A and 15B. Starting at the first quadrant of the right rotor 224 shown in FIG. 15B, the rolling bank of material flows along the lead surface of long wing 232 and toward the driving end 228 of that rotor. The circular arrows indicate high shear mixing as some of the material passes over the tips of the rotor wings. The rolling bank which is the driving end 228 which causes it to join a rolling bank adjacent the long wing 236. A rolling bank of material flows along the leading surface of the short wing 234 and toward the trailing end of the long wing 236. However, the short wing 234 is too far away from the long wing 236 to cause a squeeze flow between them. The short wing 234 was purposely placed in the second quadrant because there was a concern that choking would occur if the short wing 234 was placed in the third quadrant where the long wing 236 is located.

Material flows among the wings of the left rotor 246 in the same manner as described immediately above with regard to the right rotor 224. The mixing provided by the rotors 224 and 226 has met with a degree of satisfaction in the past. However, the mixing does not include as intensive and as effective degree of mixing produced by the increased turbulence caused by the squeeze flow and relief produced by pairs of lobes in accordance with the principles of this invention. Since the rotors 224 and 226 are not intermeshing, there is a less efficient transfer of material in the central area between these rotors than occurs between intermeshing rotors used in accordance with this invention.

Figure 16A:
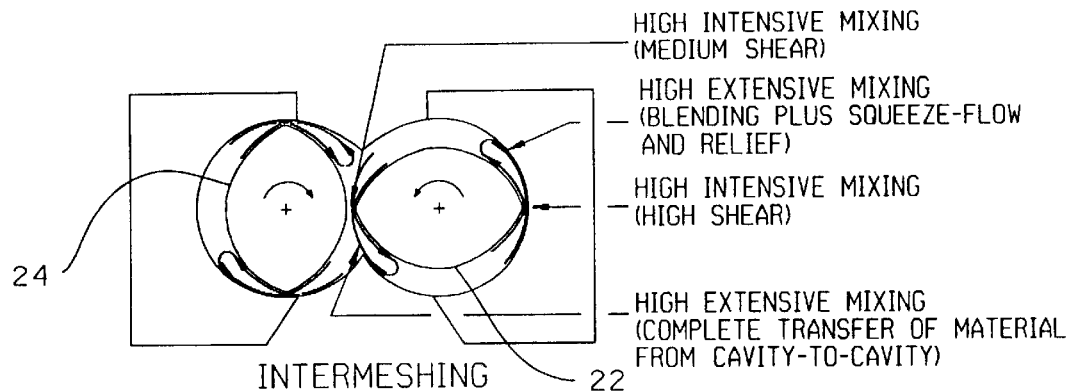
FIGS. 16A–16C are schematics showing mixing produced in mixing machines by two arrangements of rotors of this invention in comparison with a rotor of the prior art.
Figure 16B:
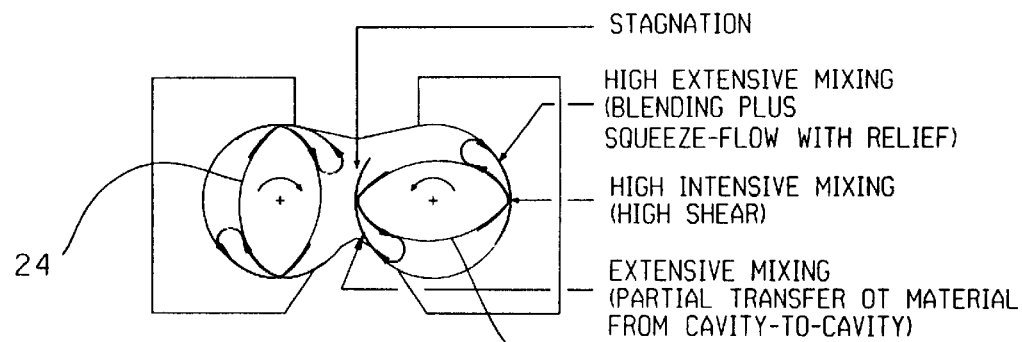
Figure 16C:
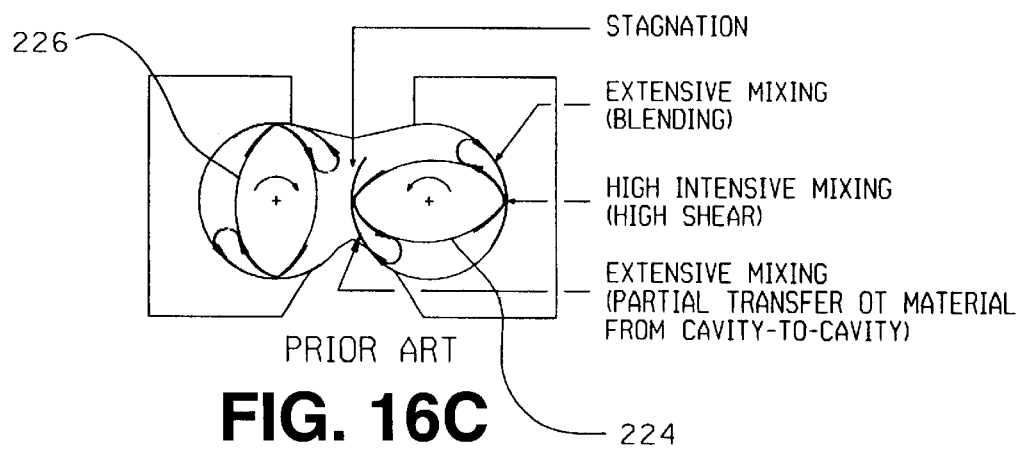

FIGS. 16A–16C show a comparison of the types of mixing which occur in a mixing machine with three types of rotor arrangements. FIG. 16A shows rotors 22 and 24 of this invention mounted as intermeshing rotors in a mixing machine, FIG. 16B shows rotors 22 and 24 of this invention used as non-intermeshing rotors, while FIG. 16C shows rotors 224 and 226 of U.S. Pat. No. 4,834,543 which must be used in a non-intermeshing configuration. FIG. 16A shows that a high extensive mixing which includes a blending of materials due to the rolling bank plus a more intensive mixing due to the squeeze flow with relief in the area between the rotor 22 and the mixing cavity. FIG. 16A also indicates where high intensive mixing occurs as a result of high shear between the tips of the major diameter of the lobes and the inside surface of the mixing cavity. Significantly, the intermeshing rotors produce a high extensive mixing produced as a result of a complete transverse of the materials plus a squeeze flow with relief occurring in the window of interaction between the rotors 22 and 24. In this area, material being mixed is transferred effectively from one of the rotating rotors to the other without stagnation of the material between the rotors.

Referring now to FIG. 16B, the use of the rotors 22 and 24 of this invention in a non-intermeshing or tangential arrangement results in a highly effective mixing of the material. However, the mixing which takes place is not as effective as that which occurs when the same rotors are used in an intermeshing installation as shown in FIG. 16A. A stagnation occurs in the window of interaction as a result of the partial transverse of the material. The squeeze flow with relief which occurs in that area enhances the mixing which occurs there in comparison with the use of prior art rotors as shown in FIG. 16C. A decrease in performance exists not only in the window of interaction, but also in the area of blending which takes place between the prior art rotors and the inside surface of the mixing cavity since there is no squeeze flow with relief to produce an enhanced mixing.

In the embodiments of the invention discussed above, each of the lobes of the rotors 22 and 24 has its leading end at an axial end of the rotor on which it is located. In another embodiment of the invention, shown in FIGS. 19 and 20, the long lobes do not have their leading ends at an axial end of the rotor. FIGS. 19 and 20 may be compared to FIGS. 3 and 4. The rotors shown in FIGS. 19 and 20 are substantially identical to the rotors shown in FIGS. 3 and 4, with the exception that the leading ends of the longer lobes of the rotors shown in FIGS. 19 and 20 are not located at axial ends of those rotors. By way of example in FIG. 3B, the long lobe 96 in the first quadrant 88 of the right rotor 22 has a leading end 104 located at the coolant end 74 of the right rotor 22. However, in the embodiment of the invention shown in FIG. 19B the long lobe 96 in the first quadrant 88 of the rotor 22 does not have its leading end 104 located at the coolant end 74 of the right rotor 22. Instead, the leading end 104 of the long lobe 96 is located near the coolant end 74 of the right rotor 22. The length of the space between the leading end 104 and the coolant end 74 will be based on the amount of flow desired through that space of the material being mixed.

Similarly, in accordance with this embodiment of this invention, the longer lobe 120 in the second quadrant 82 of the left rotor 24 shown in FIGS. 19B and 20B has its leading end 128 located near, but not at, the drive end 76 of left rotor 24; the long lobe 100 is located in the third quadrant 92 of the right rotor 22 and has its leading end 112 located near, but not at, the drive end 72 of the right rotor 22; and the long lobe 124 is located in the fourth quadrant 86 of the left rotor 24 and has its leading end 136 located near, but not at, the coolant end 78 of left rotor 24.

The axial length of each short lobe 98, 102, 122 and 126 should be longer than the length of the space between the leading end of the long lobe upstream of it and the axial end of the rotor which that leading end is near to deflect material passing through that space toward the mid portion of the rotor. This material flows toward the space between the trailing ends of the pair of lobes and in doing so becomes confluent with the material flowing adjacent the long lobe. In accordance with this invention, this confluent material is squeezed as it flows through the space between the trailing ends of both the long lobe and the short lobe. The built-up pressure on material in that space is relieved as the material flows out of the space, thereby enhancing the mixing of the material.

Thus, referring to FIG. 19B, the axial length of the short lobe 102 in the third quadrant 92 of the right rotor 22 should be longer than the length of the space between the leading end 104 of the long lobe 96 in the first quadrant 88 of the right rotor 22 and the coolant end 74 of the right rotor 22. Similarly, the axial length of the short lobe 98 in the first quadrant 88 of the right rotor 22 should be longer than the length of the space between the leading end 112 of the long lobe 100 in the third quadrant 92 of the right rotor 22 and the drive end 72 of the right rotor 22; and the axial length of the short lobe 122 in the second quadrant 82 of the left rotor 24 in FIG. 19A should be longer than the length of the space between the leading end 136 of the long lobe 124 in the fourth quadrant 86 of the left rotor 24 and the coolant end 78 of the left rotor 24; and the axial length of the short lobe 126 should be greater than the space between the leading end 128 of the long lobe 120 in the second quadrant 82 of the left rotor 24 and the drive end 76 of the left rotor 24.

Figure 19A:
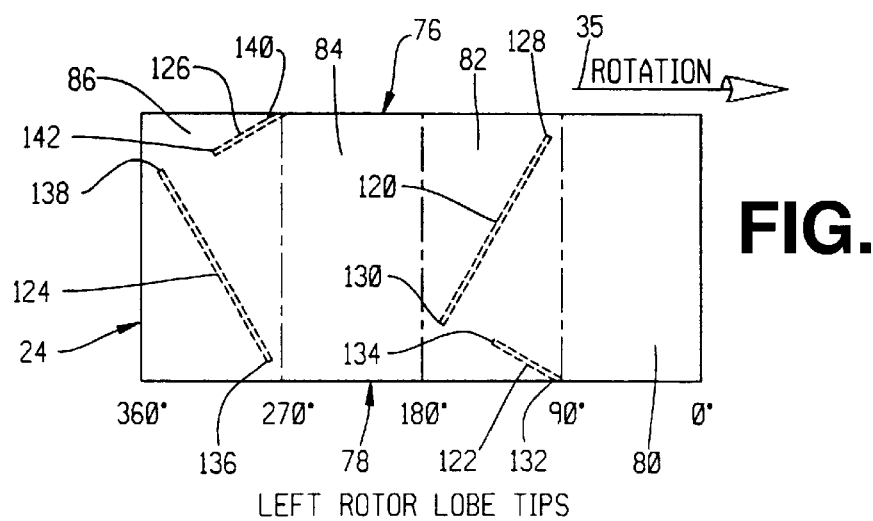
FIGS. 19A–19C are schematics of the orientation of the lobes of the rotors shown in FIG. 18 produced by unwrapping the circumferential envelope that contains the rotor lobes.
Figure 19B:
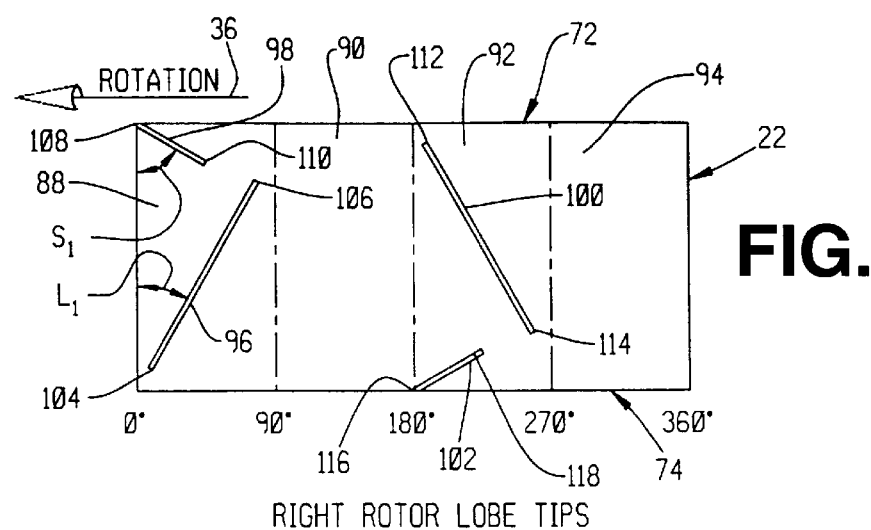
Figure 19C:
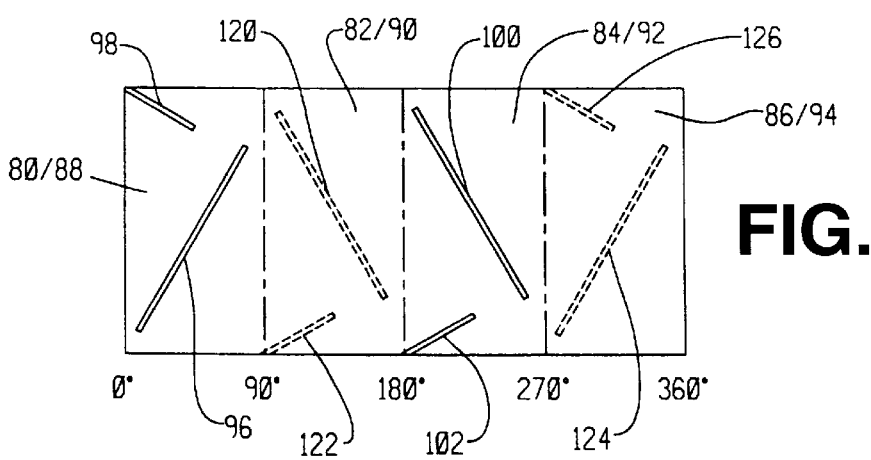

The flow of material of the lobes shown in FIGS. 19A–19C is depicted in FIGS. 20A–20C. The flow of material as shown in FIGS. 20A–20C is substantially like the flow of material as shown in FIG. 4 of the previously described embodiment of the invention. As in the previously described embodiment, FIG. 20 reveals a funnel like effect whereby material is funneled in between the long lobe 96 and the short lobe 98 of the right rotor 22, between the long lobe 100 and the short lobe 102 of the right rotor 22, between the long lobe 120 and the short lobe 122 of the left rotor 24, and between the long lobe 124 and the short lobe 126 of the left rotor 24. However, in addition material slips past the leading end of the longs lobes and impinges on a short lobe downstream in the flow of materials.

As can be seen in FIG. 20B, material flows out of the space between the leading ends of the long lobes and impinges on a short lobe downstream in the flow of material, on the same side of the rotor. Material flows between the leading end 112 of the long lobe 100 and the drive end 72 in the third quadrant 92 of the right rotor 22 and impinges on the short lobe 98 in the first quadrant 88 of the right rotor 22. Also, in the right rotor 22, material flows between the leading end 104 of the long lobe 96 and the coolant end 74 in the first quadrant 88 of the right rotor 22 and impinges on the short lobe 102 in the third quadrant 92 of the right rotor 22. Similarly, in the left rotor 24, as shown in FIG. 20A, material flows between the leading end 128 of the long lobe 120 and the drive end 76 in the second quadrant 82 of the left rotor 24 and impinges on the short lobe 126 in the fourth quadrant 86 of the left rotor 22. Likewise, in the left rotor 24, as shown in FIG. 20A, material flows between the leading end 136 of the long lobe 124 and the coolant end 78 in the fourth quadrant 86 of the left rotor 24 and impinges on the short lobe 122 in the second quadrant 82 of the left rotor 22.

Those skilled in the art will recognize that many modifications can be made to the rotors shown in the preferred embodiments of this invention which were described above without departing from the spirit and scope of this invention. The size of the space between the trailing ends of the lobes of each pair of lobes can be varied to process different types of polymer materials. Generally speaking a larger space is required to process rubber for making tires and a smaller space is desirable for processing rubber to make mechanical goods. Additionally, FIGS. 3A and 3B show that all of the lobes have their leading ends originate at the beginning of the quadrant in which these lobes are located. Thus, the lobes 96 and 98 in the first quadrant of the right rotor 22 shown in FIG. 3B have their leading ends 104 and 108, respectively, located at 0° of circumferential rotation. Either or both of the leading ends of these lobes could be moved within the quadrant to a location of origin desirable to obtain satisfactory mixing of the material being mixed in the internal batch mixing machine. Similarly, the lengths of the long and short lobes can vary as desired. The acute angles at which the lobes extend away from the direction of rotation could be changed as well to accommodate different types, viscosities and temperatures of material.

Those skilled in the art will recognize that the various features of this invention described above can be used both in a pair of replacement rotors used to rebuild an existing mixing machine and in the construction of a new internal batch mixing machine. This invention has been explained with respect to the details, arrangements of components, and certain specific embodiments shown in the accompanying drawings. Many modifications can be made to these embodiments by those skilled in the art without departing from the spirit and scope of this invention. Thus, the appended claims are intended to be interpreted to cover such equivalent rotors and internal batch mixing machines which do not depart from the spirit and scope of this invention.

What is claimed is:

1. An internal batch mixing machine for mixing material comprising, in combination:
   a mixer body;
   a pair of cavities located within said mixer body;
   a first rotor and a second rotor mounted parallel to one another so as to intermesh in said pair of cavities;
   a driving system for controllably rotating said rotors in opposite directions to mix material within said cavities;
   said first rotor having an axis of rotation, a first axial end and a second axial end; said first rotor having a circumference divided into first, second, third and fourth sequential quadrants spaced in a direction opposite to an intended direction of rotation of said first rotor; said first rotor having a pair of lobes consisting of a first quadrant long lobe and a first quadrant short lobe, both located entirely in the first quadrant and at least a third quadrant long lobe, both located entirely in the third quadrant;
   said second rotor having an axis of rotation and having a first axial end and a second axial end; said first axial end and said second axial end of said second rotor mounted to be rotated, respectively, adjacent said first axial end and said second axial end of said first rotor; said second rotor having a circumference divided into first, second, third and fourth sequential quadrants spaced in a direction opposite to an intended direction of rotation of said second rotor; said second rotor having a pair of lobes consisting of a second quadrant long lobe and a second quadrant short lobe, both located entirely in the second quadrant, and at least one fourth quadrant long lobe located entirely in the fourth quadrant;
   each lobe having a leading end and a trailing end; said long lobe of each pair of lobes having its leading end located in one of two axial halves of the quadrant in which it is located and said short lobe of each pair of lobes having its leading end located in the second of two axial halves of the quadrant in which said pair of lobes is located; each of said lobes extending downstream at an acute cohelix angle toward the axial half of the quadrant opposite to the axial half in which its leading end is located;
   said second quadrant long lobe having its leading end located in the axial half of the second quadrant of said second rotor which is opposite to the axial half of the first quadrant of said first rotor in which said leading end of said first quadrant long lobe is located; said fourth quadrant lobe having its leading end located in the axial half of the fourth quadrant of said second rotor which is opposite to the axial half of the third quadrant of said first rotor in which said leading end of a corresponding third quadrant lobe is located;
   the four quadrants of said first rotor and the four quadrants of said second rotor having sizes and said lobes being placed within the quadrants of said first rotor and said second rotor in which they are located so that said lobes located within the first quadrant of said first rotor fit among said lobes located within the second quadrant of said second rotor and said at least one fourth quadrant long lobe located within the fourth quadrant of said second rotor when said first and second rotors intermesh, and said at least one third quadrant long lobe located in the third quadrant of said first rotor fit among said at least one fourth quadrant long lobe located in the fourth quadrant of said second rotor and said lobes located in the second quadrant of said second rotor when said first and second rotors intermesh;
   said lobes of each pair of lobes having respective lengths, respective locations of their leading ends within the half of the quadrant of the rotor in which each of said leading ends is located and respective acute cohelix angles at which said lobes extend to cause material adjacent said long lobe of each pair of lobes to be pushed away from one axial end of the rotor and toward the other axial end of that rotor, and to form a space between said trailing ends of each pair of lobes having a size which causes confluent material at the space to be squeezed between and flow out of the trailing ends of both lobes of each pair of lobes.

2. A pair of rotors according to claim 1 in which each of the quadrants of said first and second rotors extends about 90° in circumferential rotation about a rotor.

3. A pair of rotors according to claim 1 in which said short lobe of each pair of lobes has its leading end at one axial end of said rotor, and said long lobe of each pair of lobes has its leading end at the other axial end of said rotor.

4. A pair of rotors according to claim 1 in which said short lobe of each pair of lobes has its leading end at one axial end of said rotor, and said long lobe of each pair of lobes has its leading end near the other axial end of said rotor.

5. A pair of rotors according to claim 1 in which the axial length of each short lobe is in the range of about 0.05 times the axial length of said rotor on which it is located to about 0.40 times the axial length of that rotor, and the axial length of each long lobe is in the range of about 0.60 times the axial length of said rotor on which it is located to about 0.95 times the axial length of that rotor.

6. A pair of rotors according to claim 1 in which the cohelix angle of each short lobe is in the range of about 10° to about 60°, and the cohelix angle of each long lobe is in the range of about 10° to about 40°.

7. A pair of rotors according to claim 1 in which the axial length of each short lobe is in the range of about 0.05 times the axial length of said rotor on which it is located to about 0.40 times the axial length of that rotor, and the axial length of each long lobe is in the range of about 0.60 times the axial length of said rotor on which it is located to about 0.95 times the axial length of that rotor, and the cohelix angle of each short lobe is in the range of about 10° to about 60°, and the cohelix angle of each long lobe is in the range of about 10° to about 40°.

8. An internal batch mixing machine according to claim 1 in which the axial length of each short lobe is in the range of about 0.01 times the axial length of said rotor on which it is located to about 0.15 times the axial length of that rotor, and the axial length of each long lobe is in the range of about 0.7 times the axial length of said rotor on which it is located to about 0.8 times the axial length of that rotor, and the cohelix angle of each short lobe and each long lobe is in the range of about 25° to about 35°.

9. A pair of rotors according to claim 1 in which the cohelix angles of all said lobes are equal.

10. A pair of rotors according to claim 1 in which the cohelix angles of all said short lobes are equal, the cohelix angles of all said long lobes are equal, and the cohelix angles of said short lobes are not equal to the cohelix angles of said long lobes.

11. A pair of rotors according to claim 1 in which each of the two long lobes on each rotor has its leading end in an axial half of the rotor which is opposite to the axial half in which the other long lobe has its leading end.

12. A pair of rotors according to claim 1 in which each of the two long lobes of each rotor has its leading end in the same axial half of the rotor in which the other long lobe has its leading end.

13. A pair of rotors according to claim 1 in which said leading ends of each lobe of each said pair of lobes are at about the same circumferential position on the rotor on which they are located.

14. A pair of rotors according to claim 1 in which said leading ends of each lobe of each said pair of lobes are at different circumferential positions on the rotors on which they are located.

15. A pair of rotors according to claim 1 in which said fourth quadrant lobe is a long lobe.

16. An internal batch mixing machine for mixing material comprising, in combination:
  a mixer body;
  a pair of cavities located within said mixer body;
  a first rotor and a second rotor mounted parallel to one another in said pair of cavities;
  a driving system for controllably rotating said rotors in opposite directions to mix material within said cavities;
  said first rotor having an axis of rotation, a first axial end and a second axial end; said first rotor having a circumference divided into first, second, third and fourth sequential 90° quadrants spaced in a direction opposite to an intended direction of rotation of said first rotor; said first rotor having a pair of lobes located entirely in the first quadrant and a pair of lobes located entirely in the third quadrant;
  said second rotor having an axis of rotation and having a first axial end and a second axial end; said first axial end and said second axial end of said rotor mounted to be rotated, respectively, adjacent said first axial end and said second axial end of said first rotor; said second rotor having a circumference divided into first, second, third and fourth sequential 90° quadrants spaced in a direction opposite to an intended direction of rotation of said second rotor; said second rotor having a pair of lobes located entirely in the second quadrant and a pair of lobes located entirely in the fourth quadrant;
  each lobe having a leading end and a trailing end; one lobe of each of the pairs of lobes having its leading end at a position on one axial end of the rotor on which it is located and the other lobe of each pair of lobes having its leading end at a position on the other axial end of the rotor on which it is located; one of said lobes of each pair of lobes being longer than the other; in each of the second and fourth quadrants of said second rotor the longer of said lobes each has its leading end at a position, respectively, at the axial end of said second rotor which is the opposite from the corresponding axial end of said first rotor at which the longer of said lobes in the first and third quadrant of the first rotor have its leading end;
  said lobes of each pair of lobes having respective lengths, locations of origin within the quadrant of the rotor on which said lobes are located and acute angles at which said lobes extend to cause material adjacent the longer lobe of each said pair of lobes to be pushed away from the axial end at which its leading end is located and toward the other axial end of that rotor and to form a space of sufficient size between the trailing ends of said lobes to cause material adjacent both of said lobes of each pair of lobes to be squeezed between and flow out of the space between said trailing ends of both of said lobes.

17. An internal batch mixing machine according to claim 16 in which the axial length of each shorter lobe of each pair of lobes is in the range of about 0.05 times the axial length of said rotor on which it is located to about 0.40 times the axial length of that rotor, and the axial length of the longer lobe is in the range of about 0.60 times the axial length of said rotor on which it is located to about 0.95 times the axial length of that rotor.

18. An internal batch mixing machine according to claim 16 in which a cohelix angle of each shorter lobe of each pair of lobes is in the range of about 10° to about 60°, and a cohelix angle of each longer lobe is in the range of about 10° to about 40°.

19. An internal batch mixing machine according to claim 16 in which the axial length of each shorter lobe is in the range of about 0.05 times the axial length of said rotor on which it is located to about 0.40 times the axial length of that rotor, and the axial length of each longer lobe is in the range of about 0.60 times the axial length of said rotor on which it is located to about 0.95 times the axial length of that rotor, and a cohelix angle of each shorter lobe is in the range of about 10° to about 60°, and a cohelix angle of each longer lobe is in the range of about 10° to about 40°.

20. An internal batch mixing machine according to claim 16 in which the axial length of each shorter lobe is in the range of about 0.01 times the axial length of said rotor on which it is located to about 0.15 times the axial length of that rotor, and the axial length of each longer lobe is in the range of about 0.7 times the axial length of said rotor on which it is located to about 0.8 times the axial length of that rotor, and a cohelix angle of each shorter lobe and each longer lobe is in the range of about 25° to about 35°.

21. An internal batch mixing machine according to claim 16 in which cohelix angles of each of the lobes are equal.

22. An internal batch mixing machine according to claim 16 in which the cohelix angles of all of the shorter lobes of the pairs of lobes are equal, cohelix angles of all of the longer lobes are equal, and cohelix angles of the shorter lobes are not equal to the cohelix angles of the longer lobes.

23. An internal batch mixing machine according to claim 16 in which each of the two longer lobes on each rotor has its leading end in an axial half of the rotor which is opposite to the axial half in which the other longer lobes has its leading end.

24. An internal batch mixing machine according to claim 16 in which each of the two longer lobes of each rotor has its leading end in the same axial half of the rotor in which the other longer lobe has its leading end.

* * * * *